United States Patent
Matsuyama et al.

(10) Patent No.: US 11,578,270 B2
(45) Date of Patent: Feb. 14, 2023

(54) LIQUID CRYSTALLINE COMPOSITION, SIDE CHAIN TYPE POLYMER LIQUID CRYSTALLINE COMPOUND, LIGHT ABSORPTION ANISOTROPIC FILM, LAMINATE, AND IMAGE DISPLAY DEVICE

(71) Applicant: FUJIFILM Corporation, Tokyo (JP)

(72) Inventors: Hiroshi Matsuyama, Kanagawa (JP); Wataru Hoshino, Kanagawa (JP); Teruki Niori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/935,700

(22) Filed: Jul. 22, 2020

(65) Prior Publication Data

US 2020/0347304 A1 Nov. 5, 2020

Related U.S. Application Data

(63) Continuation of application No. PCT/JP2019/003166, filed on Jan. 30, 2019.

(30) Foreign Application Priority Data

Jan. 31, 2018 (JP) .............................. JP2018-015030

(51) Int. Cl.
*C09K 19/38* (2006.01)
*C09K 19/20* (2006.01)
*C09K 19/60* (2006.01)

(52) U.S. Cl.
CPC ...... *C09K 19/3838* (2013.01); *C09K 19/2007* (2013.01); *C09K 19/3852* (2013.01); *C09K 19/3876* (2013.01); *C09K 19/60* (2013.01); *C09K 2019/2042* (2013.01); *C09K 2019/2078* (2013.01); *C09K 2219/03* (2013.01); *C09K 2323/035* (2020.08)

(58) Field of Classification Search
CPC ............ C09K 19/3852; C09K 19/3833; C09K 19/60; C09K 19/601; C09K 19/603; C09K 19/605; C09K 19/606; C09K 19/608
See application file for complete search history.

(56) References Cited

U.S. PATENT DOCUMENTS

| | | | | |
|---|---|---|---|---|
| 5,339,306 A * | 8/1994 | Yoshinaga | ........... | G11B 7/0051 369/100 |
| 5,620,781 A * | 4/1997 | Akashi | ................... | B41M 5/281 252/299.01 |
| 2002/0076511 A1* | 6/2002 | Sanada | .............. | C09K 19/3402 428/1.1 |
| 2007/0007492 A1* | 1/2007 | Takaku | ................ | C09K 19/408 252/299.01 |
| 2010/0053509 A1* | 3/2010 | Saitoh | .................. | G02B 5/3083 359/489.07 |
| 2012/0145974 A1 | 6/2012 | Takahashi et al. | | |
| 2016/0340367 A1* | 11/2016 | Katoh | ................. | C09B 67/0046 |

FOREIGN PATENT DOCUMENTS

| | | | |
|---|---|---|---|
| CN | 102414214 A | | 4/2012 |
| JP | 03153752 A | * | 7/1991 |
| JP | 11-101964 A | | 4/1999 |
| JP | 2000-327924 A | | 11/2000 |
| JP | 2001-271069 A | | 10/2001 |
| JP | 2007-009120 A | | 1/2007 |
| JP | 2011-237513 A | | 11/2011 |
| WO | 2017/170951 A1 | | 10/2017 |

OTHER PUBLICATIONS

Hansch et al., "A survey of Hammett substituent constants and resonance and field parameters", Chemical Reviews, 1991, vol. 91, 165-195. (Year: 1991).*
English translation of JP03153752. (Year: 1991).*
Goozner et al., "Electric field effects on a liquid-crystalline side chain polymer with a negative dielectric anisotropy", 1985, Makromolekulare Chemie, 186, 2407-2414. (Year: 1985).*
International Search Report issued in PCT/JP2019/003166 dated Apr. 23, 2019.
Written Opinion issued in PCT/JP2019/003166 dated Apr. 23, 2019.
International Preliminary Report on Patentability completed by WIPO dated Aug. 4, 2020 in connection with International Patent Application No. PCT/JP2019/003166.
Corwin Hansch et al., A Survey of Hammett Substituent Constants and Field Parameters, Chemical Reviews, 1991, vol. 91, pp. 165-195, American Chemical Society.
Office Action, issued by the Japanese Patent Office on Jun. 8, 2021, in connection with Japanese Patent Application No. 2019-569179.
Office Action was issued by the State Intellectual Property Office dated Oct. 18, 2021, in connection with corresponding Japanese Patent Application No. 201980010848.3.
Office Action, issued by the Korean Intellectual Property Office dated Jan. 21, 2022, in connection with corresponding Korean Patent Application No. 10-2020-7021991.

* cited by examiner

*Primary Examiner* — Chanceity N Robinson
*Assistant Examiner* — Anna Malloy
(74) *Attorney, Agent, or Firm* — Edwards Neils LLC; Jean C. Edwards, Esq.

(57) ABSTRACT

A side chain type polymer liquid crystalline compound with which a light absorption anisotropic film having a high alignment degree can be formed, which includes a liquid crystalline composition, a light absorption anisotropic film which is formed of the liquid crystalline composition, a laminate, and an image display device. A liquid crystalline composition contains a side chain type polymer liquid crystalline compound and a dichroic substance, the side chain type polymer liquid crystalline compound is a copolymer having repeating units 1 and 2, the repeating unit 1 has a mesogenic group and an electron-withdrawing group having a Hammett's substituent constant σp of greater than 0 at a terminal of the mesogenic group, and the repeating unit 2 has a mesogenic group and a group having a Hammett's substituent constant σp of 0 or less at a terminal of the mesogenic group.

15 Claims, No Drawings

LIQUID CRYSTALLINE COMPOSITION, SIDE CHAIN TYPE POLYMER LIQUID CRYSTALLINE COMPOUND, LIGHT ABSORPTION ANISOTROPIC FILM, LAMINATE, AND IMAGE DISPLAY DEVICE

CROSS-REFERENCE TO RELATED APPLICATIONS

This application is a Continuation of PCT International Application No. PCT/JP2019/003166 filed on Jan. 30, 2019, which was published under PCT Article 21(2) in Japanese, and which claims priority under 35 U.S.C. § 119(a) to Japanese Patent Application No. 2018-015030 filed on Jan. 31, 2018. The above applications are hereby expressly incorporated by reference, in their entirety, into the present application.

BACKGROUND OF THE INVENTION

1. Field of the Invention

The present invention relates to a liquid crystalline composition, a side chain type polymer liquid crystalline compound, a light absorption anisotropic film, a laminate, and an image display device.

2. Description of the Related Art

In the past, devices which are operated by different principles for each function have been used in a case where an attenuation function, a polarization function, a scattering function, a shielding function, or the like is required in relation to irradiated light including laser light and natural light. Therefore, products corresponding to the above-described functions have been manufactured through different manufacturing processes for each function.

For example, in liquid crystal displays (LCDs), a linearly polarizing plate or a circularly polarizing plate is used to control optical activity and a birefringent property in display. In addition, in organic light emitting diodes (OLEDs), a circularly polarizing plate is used to prevent external light from being reflected.

Iodine has been widely used as a dichroic substance in these polarizing plates (polarizing elements). However, a polarizing element using an organic dye as a dichroic substance instead of iodine has also been examined.

For example, in JP2011-237513A, "a light absorption anisotropic film containing at least one kind of thermotropic liquid crystalline dichroic dye and at least one kind of thermotropic liquid crystalline polymer, in which the mass content of the thermotropic liquid crystalline dichroic dye in the light absorption anisotropic film is 30% or greater" is described (claim 1).

SUMMARY OF THE INVENTION

The inventors have examined the light absorption anisotropic film described in JP2011-237513A, and found that depending on the kind of the thermotropic liquid crystalline polymer used for forming the light absorption anisotropic film, the alignment degree of the light absorption anisotropic film may become insufficient with a reduction in the alignment degree of the dichroic substance and there is room for improvement.

Accordingly, an object of the present invention is to provide a side chain type polymer liquid crystalline compound with which a light absorption anisotropic film having a high alignment degree can be formed, a liquid crystalline composition, a light absorption anisotropic film which is formed of the liquid crystalline composition, a laminate, and an image display device.

The present inventors have conducted intensive studies to achieve the object, and as a result, found that in a case where a side chain type polymer liquid crystalline compound which has a repeating unit 1 having a mesogenic group and an electron-withdrawing group having a Hammett's substituent constant σp of greater than 0 at a terminal of the mesogenic group and a repeating unit 2 having a mesogenic group and a group having a Hammett's substituent constant σp of 0 or less at a terminal of the mesogenic group is blended with a dichroic substance, the alignment degree of a light absorption anisotropic film to be formed using the side chain type polymer liquid crystalline compound is higher than that in a case where a side chain type polymer liquid crystalline compound which does not have the repeating unit 1 or 2 is used, and completed the present invention.

That is, the inventors have found that the object can be achieved with the following configuration.

[1] A liquid crystalline composition comprising: a side chain type polymer liquid crystalline compound; and a dichroic substance, in which the side chain type polymer liquid crystalline compound is a copolymer having repeating units 1 and 2, the repeating unit 1 has a mesogenic group and an electron-withdrawing group having a Hammett's substituent constant σp of greater than 0 at a terminal of the mesogenic group, and the repeating unit 2 has a mesogenic group and a group having a Hammett's substituent constant σp of 0 or less at a terminal of the mesogenic group.

[2] The liquid crystalline composition according to [1], in which the repeating unit 1 is a repeating unit represented by Formula (1), and the repeating unit 2 does not correspond to the repeating unit represented by Formula (1), but is a repeating unit represented by Formula (2).

In Formula (1), P1 represents a main chain of the repeating unit, L1 represents a single bond or a divalent linking group, SP1 and SP2 each independently represent a spacer group, M1 represents a mesogenic group, and EWG represents an electron-withdrawing group having a Hammett's substituent constant σp of greater than 0.

In Formula (2), P2 represents a main chain of the repeating unit, L2 represents a single bond or a divalent linking group, SP3 represents a spacer group, M2 represents a mesogenic group having three or more cyclic structures, and T1 represents an electron-donating group having a Hammett's substituent constant σp of less than 0.

[3] The liquid crystalline composition according to [1] or [2], in which the electron-withdrawing group of the repeating unit 1 has a Hammett's substituent constant σp of 0.3 or greater, and the group of the repeating unit 2 is an electron-donating group having a Hammett's substituent constant σp of −0.1 or less.

[4] The liquid crystalline composition according to any one of [1] to [3], in which a content of the repeating unit 1 is 40 mass % or less with respect to a total mass of the side chain type polymer liquid crystalline compound, and a content of the repeating unit 2 is 60 mass % or greater with respect to the total mass of the side chain type polymer liquid crystalline compound.

[5] The liquid crystalline composition according to any one of [1] to [4], in which a product of the Hammett's substituent constant σp of the electron-withdrawing group of the repeating unit 1 and a mass-based content ratio of the repeating unit 1 in the side chain type polymer liquid crystalline compound is 0.02 to 0.15.

[6] The liquid crystalline composition according to any one of [1] to [5], in which the product of the Hammett's substituent constant σp of the electron-withdrawing group of the repeating unit 1 and the mass-based content ratio of the repeating unit 1 in the side chain type polymer liquid crystalline compound is 0.050 to 0.130.

[7] The liquid crystalline composition according to any one of [2] to [6], in which SP in Formula (1) and SP3 in Formula (2) have the same structure.

[8] The liquid crystalline composition according to any one of [2] to [7], in which M1 in Formula (1) and M2 in Formula (2) have the same structure.

[9] The liquid crystalline composition according to any one of [2] to [8], in which SP2 in Formula (1) is a single bond.

[10] A side chain type polymer liquid crystalline compound which is a copolymer, comprising: a repeating unit 1; and a repeating unit 2, in which the repeating unit 1 is a repeating unit represented by Formula (1), the repeating unit 2 does not correspond to the repeating unit represented by Formula (1), but is a repeating unit represented by Formula (2), and M1 in Formula (1) and M2 in Formula (2) have the same structure.

In Formula (1), P1 represents a main chain of the repeating unit, L1 represents a single bond or a divalent linking group, SP1 and SP2 each independently represent a spacer group, M1 represents a mesogenic group having three or more cyclic structures, and EWG represents an electron-withdrawing group having a Hammett's substituent constant σp of greater than 0.

In Formula (2), P2 represents a main chain of the repeating unit, L2 represents a single bond or a divalent linking group, SP3 represents a spacer group, M2 represents a mesogenic group having three or more cyclic structures, and T1 represents an electron-donating group having a Hammett's substituent constant σp of less than 0.

[11] A light absorption anisotropic film which is formed using the liquid crystalline composition according to any one of [1] to [9].

[12] A laminate comprising: a base; and the light absorption anisotropic film according to [11] which is provided on the base.

[13] The laminate according to [12], further comprising: λ/4 plate which is provided on the light absorption anisotropic film.

[14] An image display device comprising: the light absorption anisotropic film according to [11]; or the laminate according to [12] or [13].

According to the present invention, it is possible to provide a side chain type polymer liquid crystalline compound with which a light absorption anisotropic film having a high alignment degree can be formed, a liquid crystalline composition, a light absorption anisotropic film which is formed of the liquid crystalline composition, a laminate, and an image display device.

DESCRIPTION OF THE PREFERRED EMBODIMENTS

Hereinafter, the present invention will be described.

The following description of constituent requirements is based on typical embodiments of the present invention, but the present invention is not limited thereto.

In this specification, a numerical value range expressed using "to" means a range including numerical values before and after "to" as a lower limit and an upper limit.

In this specification, the term (meth)acrylic acid is a generic term for "acrylic acid" and "methacrylic acid", the term (meth)acryloyl is a generic term for "acryloyl" and "methacryloyl", and the term (meth)acryloyloxy is a generic term for "acryloyloxy" and "methacryloyloxy".

[Liquid Crystalline Composition]

A liquid crystalline composition according to the embodiment of the present invention contains a side chain type polymer liquid crystalline compound and a dichroic substance. In the present invention, the side chain type polymer liquid crystalline compound is a copolymer having a repeating unit 1 and a repeating unit 2.

The repeating unit 1 of the side chain type polymer liquid crystalline compound according to the embodiment of the present invention has a mesogenic group and an electron-withdrawing group having a Hammett's substituent constant σp of greater than 0 at a terminal of the mesogenic group.

The repeating unit 2 of the side chain type polymer liquid crystalline compound according to the embodiment of the present invention has a mesogenic group and a group having a Hammett's substituent constant σp of 0 or less at a terminal of the mesogenic group. In this specification, the Hammett's substituent constant σp may be simply abbreviated as "σp value".

The inventors have studied a side chain type polymer liquid crystalline compound to obtain a light absorption anisotropic film having a high alignment degree, and found that the alignment degree changes due to an electron-donating or electron-withdrawing terminal group of the repeating unit of the side chain type polymer liquid crystalline compound. Specifically, the inventors have found that in a case where the liquid crystalline composition according to the embodiment of the present invention contains a side chain type polymer liquid crystalline compound having a repeating unit 1 having a mesogenic group and an electron-withdrawing group having a σp value greater than 0 at a terminal of the mesogenic group and a repeating unit 2 having a mesogenic group and a group having a σp value of 0 or less at a terminal of the mesogenic group, the alignment degree of a light absorption anisotropic film to be formed using the side chain type polymer liquid crystalline compound is improved in comparison to that in a case where a side chain type polymer liquid crystalline compound having only one of the repeating unit 1 or the repeating unit 2 is used, and completed the present invention. The reason for this is not clear in detail, but roughly presumed as follows.

That is, it is presumed that since opposite dipole moments generated in the repeating units 1 and 2 cause an intermolecular interaction, the interaction of the mesogenic group in a short axis direction is increased, and thus the liquid crystal alignment direction becomes more uniform, and as a result, the degree of order of the liquid crystal is thought to be increased. Accordingly, it is presumed that the alignment property of the dichroic substance is also improved, and the alignment degree of a light absorption anisotropic film to be formed is thus increased.

[Side Chain Type Polymer Liquid Crystalline Compound]

The side chain type polymer liquid crystalline compound according to the embodiment of the present invention is a copolymer which has a repeating unit 1 having a mesogenic group and an electron-withdrawing group having a σp value greater than 0 at a terminal of the mesogenic group and a repeating unit 2 having a mesogenic group and a group having a σp value of 0 or less at a terminal of the mesogenic group. The side chain type polymer liquid crystalline compound may be any polymer such as a block polymer, an alternating polymer, a random polymer, or a graft polymer.

Here, the side chain type polymer liquid crystalline compound means a polymer liquid crystalline compound having a liquid crystal structure in a side chain. Hereinafter, the side chain type polymer liquid crystalline compound may be abbreviated as "polymer liquid crystalline compound".

<Repeating Unit 1>

The repeating unit 1 has a mesogenic group and an electron-withdrawing group having a σp value greater than 0 at a terminal of the mesogenic group.

The mesogenic group is a group showing the main skeleton of liquid crystal molecules contributing to the formation of liquid crystal. Details thereof are as described in the description of M1 of Formula (1) to be described later, and specific examples thereof are also the same.

The electron-withdrawing group is a group positioned at the terminal of the mesogenic group and having a σp value greater than 0. Examples of the electron-withdrawing group (a group having a σp value greater than 0) include a group represented by EWG in Formula (1) to be described later, and specific examples thereof are also the same.

The σp value of the electron-withdrawing group is greater than 0, and from the viewpoint that the alignment degree of a light absorption anisotropic film is further increased, the σp value is preferably 0.3 or greater, and more preferably 0.4 or greater. The upper limit of the σp value of the electron-withdrawing group is preferably 1.2 or less, and more preferably 1.0 or less from the viewpoint of excellent uniformity in alignment.

Here, the substituent constant σ of Hammett's rule is a numerical value representing the effect of the substituent on the acid dissociation equilibrium constant of a substituted benzoic acid, and is a parameter indicating the electron-withdrawing and electron-donating strengths of the substituent. In this specification, the Hammett's substituent constant σp means a substituent constant σ in a case where the substituent is positioned at the para-position of benzoic acid.

In this specification, as the Hammett's substituent constant σp of each group, a value described in the literature "Hansch et al., Chemical Reviews, 1991, Vol. 91, No. 2, p. 165 to 195" is employed. Regarding a group whose Hammett's substituent constant σp is not shown in the above literature, the Hammett's substituent constant σp can be calculated based on a difference between the pKa of the benzoic acid and the pKa of the benzoic acid derivative having a substituent at the para-position using software "ACD/ChemSketch (ACD/Labs 8.00 Release Product Version: 8.08)".

The repeating unit 1 is not particularly limited as long as it has, in a side chain, a mesogenic group and an electron-withdrawing group having a σp value greater than 0 at a terminal of the mesogenic group, and from the viewpoint that the alignment degree of a light absorption anisotropic film is further increased, the repeating unit is preferably represented by Formula (1).

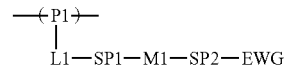

In Formula (1), P1 represents a main chain of the repeating unit, L1 represents a single bond or a divalent linking group, SP1 and SP2 each independently represent a spacer group, M1 represents a mesogenic group, and EWG represents an electron-withdrawing group having a σp value greater than 0.

Specific examples of the main chain of the repeating unit represented by P1 include groups represented by Formulae (P1-A) to (P1-D). Among these, groups represented by Formula (P1-A) are preferable from the viewpoint of diversity of monomers as raw materials and ease of handling.

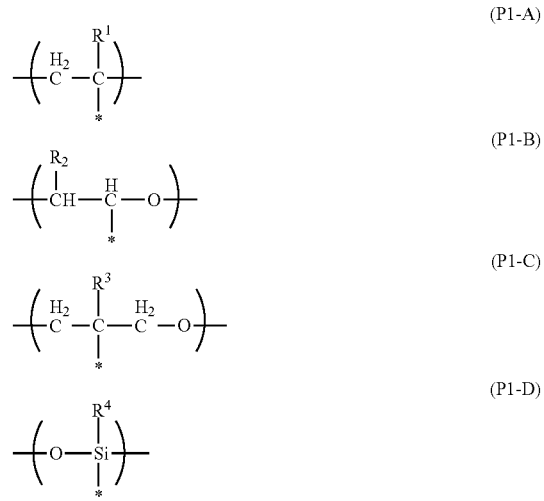

In Formulae (P1-A) to (P1-D), "*" represents a bonding position to L1 in Formula (1). In Formulae (P1-A) to (P1-D), $R^1$, $R^2$, $R^3$, and $R^4$ each independently represent a hydrogen atom, a halogen atom, an alkyl group having 1 to 10 carbon atoms, or an alkoxy group having 1 to 10 carbon atoms. The alkyl group may be a linear or branched alkyl group or an alkyl group having a cyclic structure (cycloalkyl group). The alkyl group preferably has 1 to 5 carbon atoms.

The group represented by Formula (P1-A) is preferably a unit of a partial structure of a poly(meth)acrylic acid ester obtained by polymerizing a (meth)acrylic acid ester.

The group represented by Formula (P1-B) is preferably an ethylene glycol unit formed by ring-opening polymerization of an epoxy group of a compound having an epoxy group.

The group represented by Formula (P1-C) is preferably a propylene glycol unit formed by ring-opening polymerization of an oxetane group of a compound having an oxetane group.

The group represented by Formula (P1-D) is preferably a siloxane unit of a polysiloxane obtained by condensation polymerization of a compound having at least one of an alkoxysilyl group or a silanol group. Here, examples of the compound having at least one of an alkoxysilyl group or a silanol group include a compound having a group represented by Formula $SiR^4(OR^5)_2$—. In the formula, $R^4$ is the same as $R^4$ in (P1-D), and a plurality of $R^5$'s each independently represent a hydrogen atom or an alkyl group having 1 to 10 carbon atoms.

L1 is a single bond or a divalent linking group.

Examples of the divalent linking group represented by L1 include —C(O)O—, —OC(O)—, —O—, —S—, —C(O)NR$^3$—, —NR$^3$C(O)—, —S(O)$_2$—, and —NR$^3$R$^4$—. In the formula, R$^3$ and R$^4$ each independently represent a hydrogen atom or an alkyl group having 1 to 6 carbon atoms which may have a substituent (for example, a substituent W to be described later). In the specific examples of the divalent linking group, a left bonding hand is bonded to P1, and a right bonding hand is bonded to SP1.

In a case where P1 is a group represented by Formula (P1-A), L1 is preferably a group represented by —C(O)O—.

In a case where P1 is a group represented by any of Formulae (P1-B) to (P1-D), L1 is preferably a single bond since the effects of the present invention are further enhanced.

The spacer group represented by SP1 is preferably a group including at least one selected from the group consisting of an oxyethylene structure, an oxypropylene structure, a polysiloxane structure, and a fluorinated alkylene structure, or a linear or branched alkylene group having 2 to 20 carbon atoms. The alkylene group may include —O—, —O—CO—, —CO—O—, or —O—CO—O—.

The spacer group represented by SP1 preferably includes at least one selected from the group consisting of an oxyethylene structure, an oxypropylene structure, a polysiloxane structure, and a fluorinated alkylene structure from the viewpoint of easy exhibition of liquid crystallinity, raw material availability, and the like.

Here, the oxyethylene structure represented by SP1 is preferably a group represented by *—(CH$_2$—CH$_2$O)$_{n1}$—*. In the formula, n1 represents an integer of 1 to 20, and * represents a bonding position to L1 or M1.

The oxypropylene structure represented by SP1 is preferably a group represented by *—(CH(CH$_3$)—CH$_2$O)$_{n2}$—*. In the formula, n2 represents an integer of 1 to 3, and * represents a bonding position to L1 or M1.

The polysiloxane structure represented by SP1 is preferably a group represented by *—(Si(CH$_3$)$_2$—O)$_{n3}$—*. In the formula, n3 represents an integer of 6 to 10, and * represents a bonding position to L1 or M1.

The fluorinated alkylene structure represented by SP1 is preferably a group represented by *—(CF$_2$—CF$_2$)$_{n4}$—*. In the formula, n4 represents an integer of 6 to 10, and * represents a bonding position to L1 or M1.

The mesogenic group represented by M1 is a group showing the main skeleton of liquid crystal molecules contributing to the formation of liquid crystal. The liquid crystal molecules exhibit liquid crystallinity in an intermediate state (mesophase) between a crystalline state and an isotropic liquid state. The mesogenic group is not particularly limited, and for example, the description on pages 7 to 16 of "Flussige Kristalle in Tabellen II" (VEB Deutsche Verlag fur Grundstoff Industrie, Leipzig, 1984) and the description in Chapter 3 of Liquid Crystal Handbook (Maruzen, 2000) edited by Liquid Crystal Handbook Editing Committee can be referred to.

The mesogenic group is preferably a group having at least one cyclic structure selected from the group consisting of an aromatic hydrocarbon group, a heterocyclic group, and an alicyclic group. Among these, the mesogenic group is preferably a group having an aromatic hydrocarbon group from the viewpoint that the effects of the present invention are further enhanced.

The mesogenic group preferably has two or more cyclic structures (preferably aromatic hydrocarbon groups), and more preferably three or more cyclic structures from the viewpoint of improving heat resistance. The mesogenic group preferably has five or less cyclic structures, and more preferably four or less cyclic structures from the viewpoint of improving solubility in an organic solvent.

The mesogenic group is preferably a group represented by Formula (M1-A) or (M1-B), and more preferably a group represented by Formula (M1-B) from the viewpoint of exhibition of liquid crystallinity, adjustment of a liquid crystal phase transition temperature, raw material availability, synthesis suitability, and from the reason for further enhancing the effects of the present invention.

$$*\!-\!(A1)_{a1}\!-\!* \quad \text{(M1-A)}$$

$$*\!-\!(A2\!-\!LA1)_{a2}\!-\!A3\!-\!* \quad \text{(M1-B)}$$

In Formula (M1-A), A1 is a divalent group selected from the group consisting of an aromatic hydrocarbon group, a heterocyclic group, and an alicyclic group. These groups may be substituted by a substituent such as an alkyl group, a fluorinated alkyl group, an alkoxy group, or a substituent W to be described later.

The divalent group represented by A1 is preferably a 4- to 6-membered ring. The divalent group represented by A1 may be monocyclic or condensed.

* represents a bonding position to SP1 or SP2.

Examples of the divalent aromatic hydrocarbon group represented by A1 include a phenylene group, a naphthylene group, a fluorene-diyl group, an anthracene-diyl group, and a tetracene-diyl group, and from the viewpoint of diversity of the design of a mesogenic skeleton and raw material availability, a phenylene group or a naphthylene group is preferable, and a phenylene group is more preferable.

The divalent heterocyclic group represented by A1 may be aromatic or non-aromatic, and is preferably a divalent aromatic heterocyclic group from the viewpoint of a further improvement in the alignment degree.

Examples of the atoms other than the carbon atom of the divalent aromatic heterocyclic group include a nitrogen atom, a sulfur atom, and an oxygen atom. In a case where the aromatic heterocyclic group has a plurality of ring-constituting atoms other than the carbon atom, these may be the same or different.

Specific examples of the divalent aromatic heterocyclic group include a pyridylene group (pyridine-diyl group), a pyridazine-diyl group, an imidazole-diyl group, a thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimide-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 is 2 or greater, a plurality of A1's may be the same or different.

a1 is preferably an integer of 2 or greater, and more preferably an integer of 3 or greater from the viewpoint that the effects of the present invention are further exhibited.

In Formula (M1-B), A2 and A3 each independently represent a divalent group selected from the group consisting of an aromatic hydrocarbon group, a heterocyclic group, and an alicyclic group. Since specific examples and preferable aspects of A2 and A3 are the same as those of A1 of Formula (M1-A), the description thereof will be omitted.

In Formula (M1-B), a2 represents an integer of 1 to 10. In a case where a2 is 2 or greater, a plurality of A2's may be the same or different, and a plurality of LA1's may be the same or different. a2 is preferably an integer of 2 or greater since the effects of the present invention are further enhanced.

In Formula (M1-B), in a case where a2 is 1, LA1 is a divalent linking group. In a case where a2 is 2 or greater, a plurality of LA1's each independently represent a single bond or a divalent linking group, and at least one of the plurality of LA1's is a divalent linking group. In a case where a2 is 2, it is preferable that one of two LA1's is a divalent linking group and the other is a single bond since the effects of the present invention are further enhanced.

Examples of the divalent linking group represented by LA1 in Formula (M1-B) include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (Z,Z',Z" each independently represent hydrogen, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. Among these, —C(O)O— is preferable since the effects of the present invention are further enhanced. LA1 may be a group formed by combining two or more of the above groups.

Specific examples of M1 include the following structures. In the following specific examples, "Ac" represents an acetyl group.

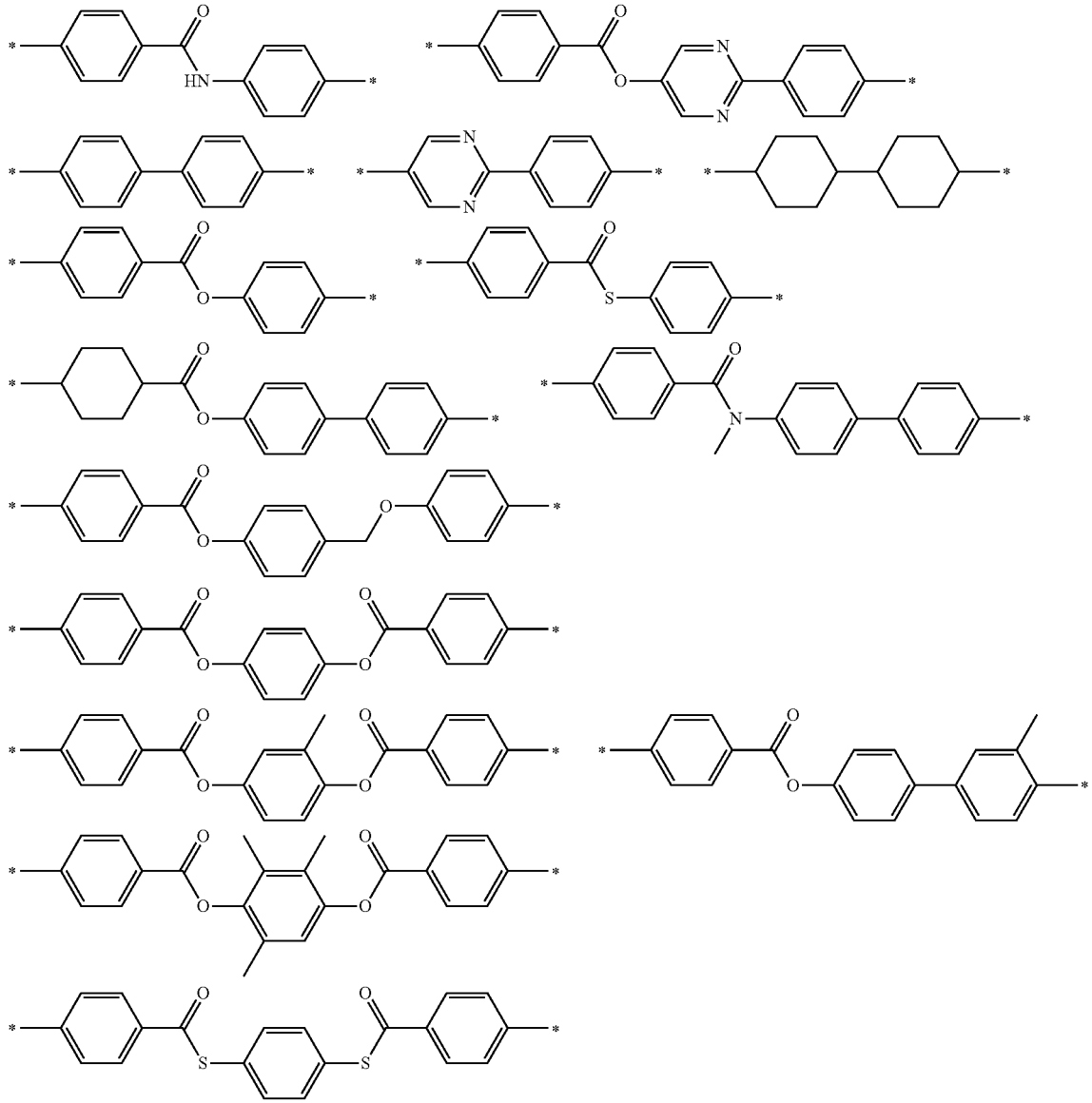

-continued
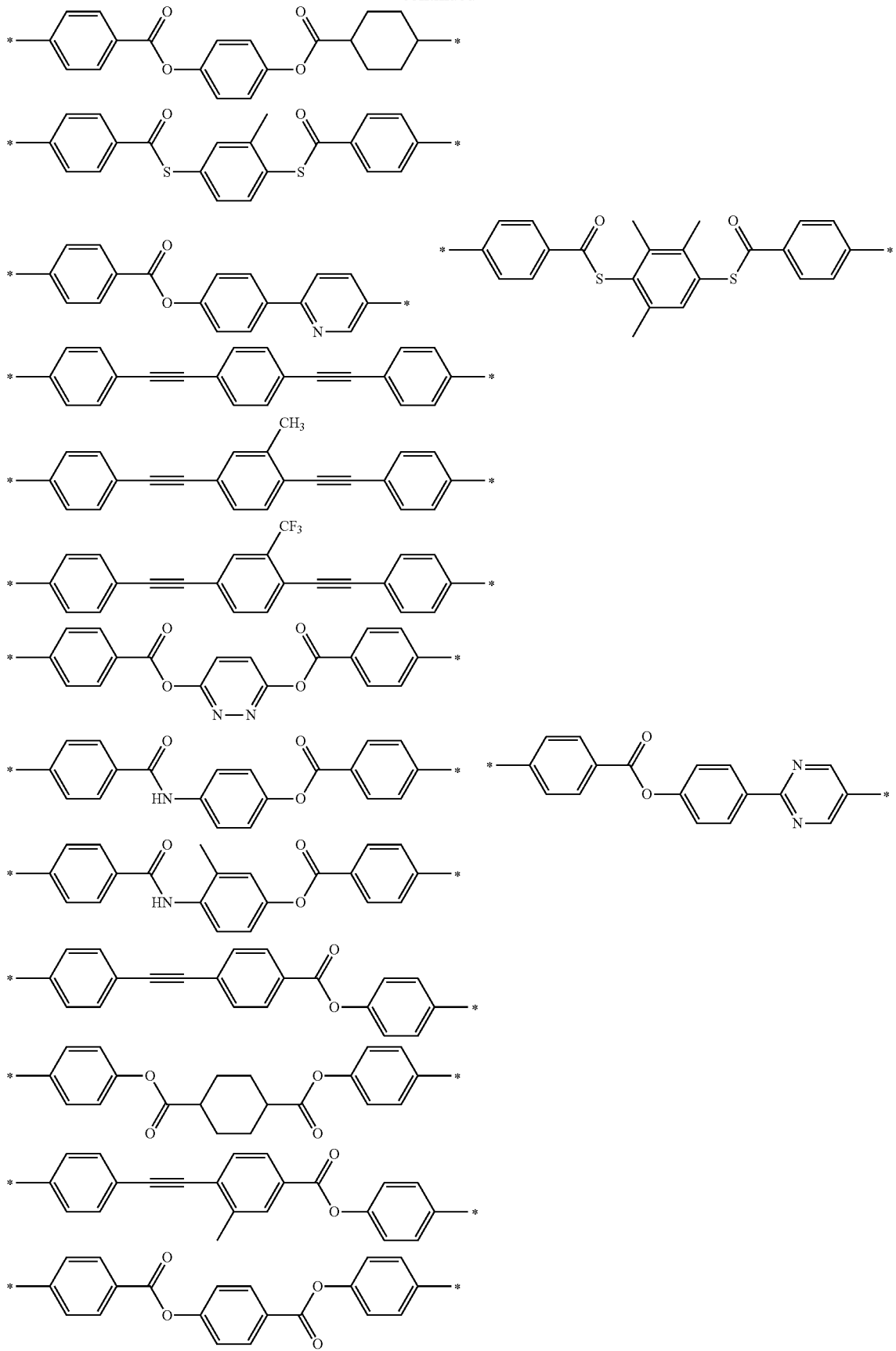

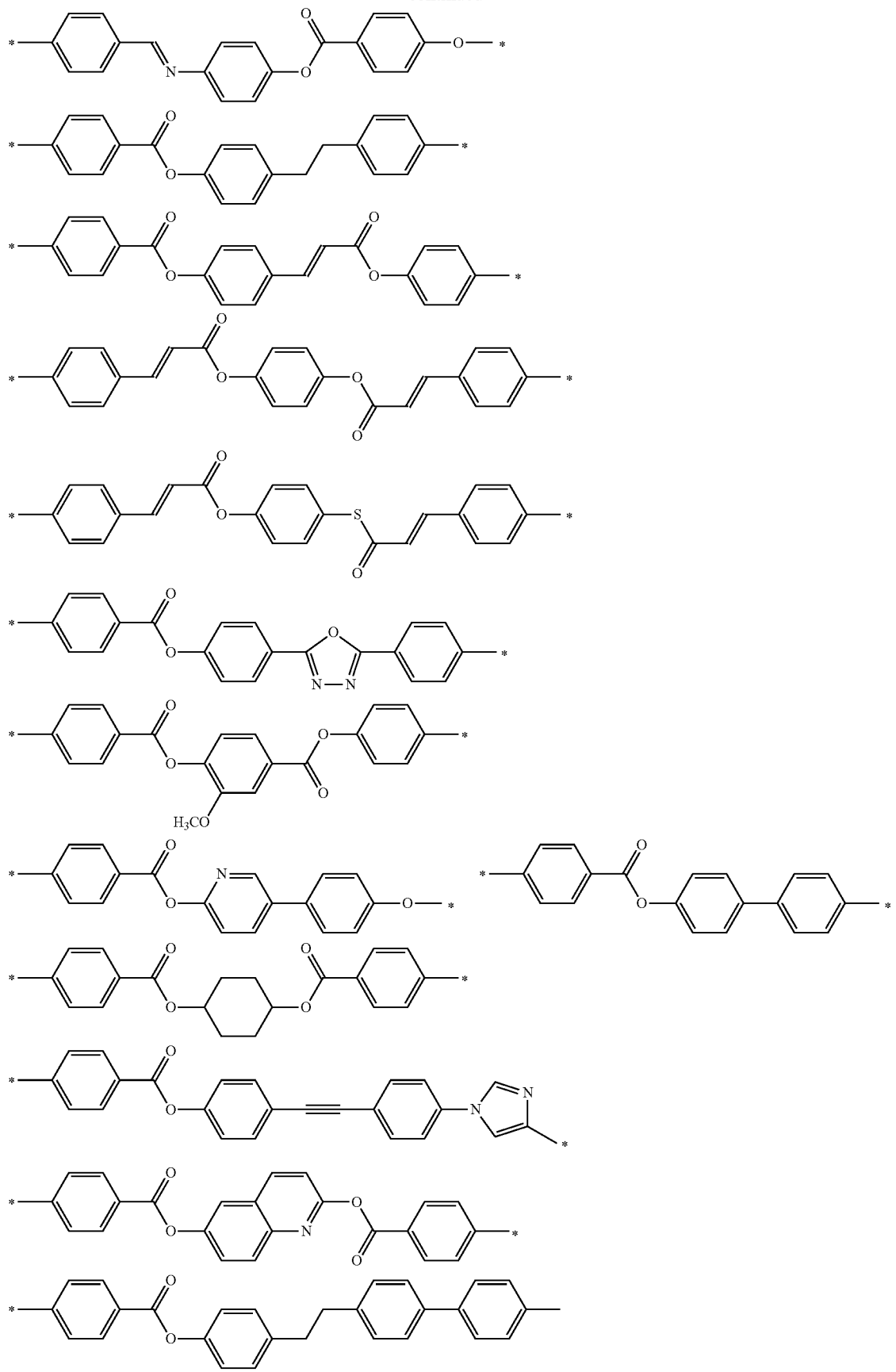

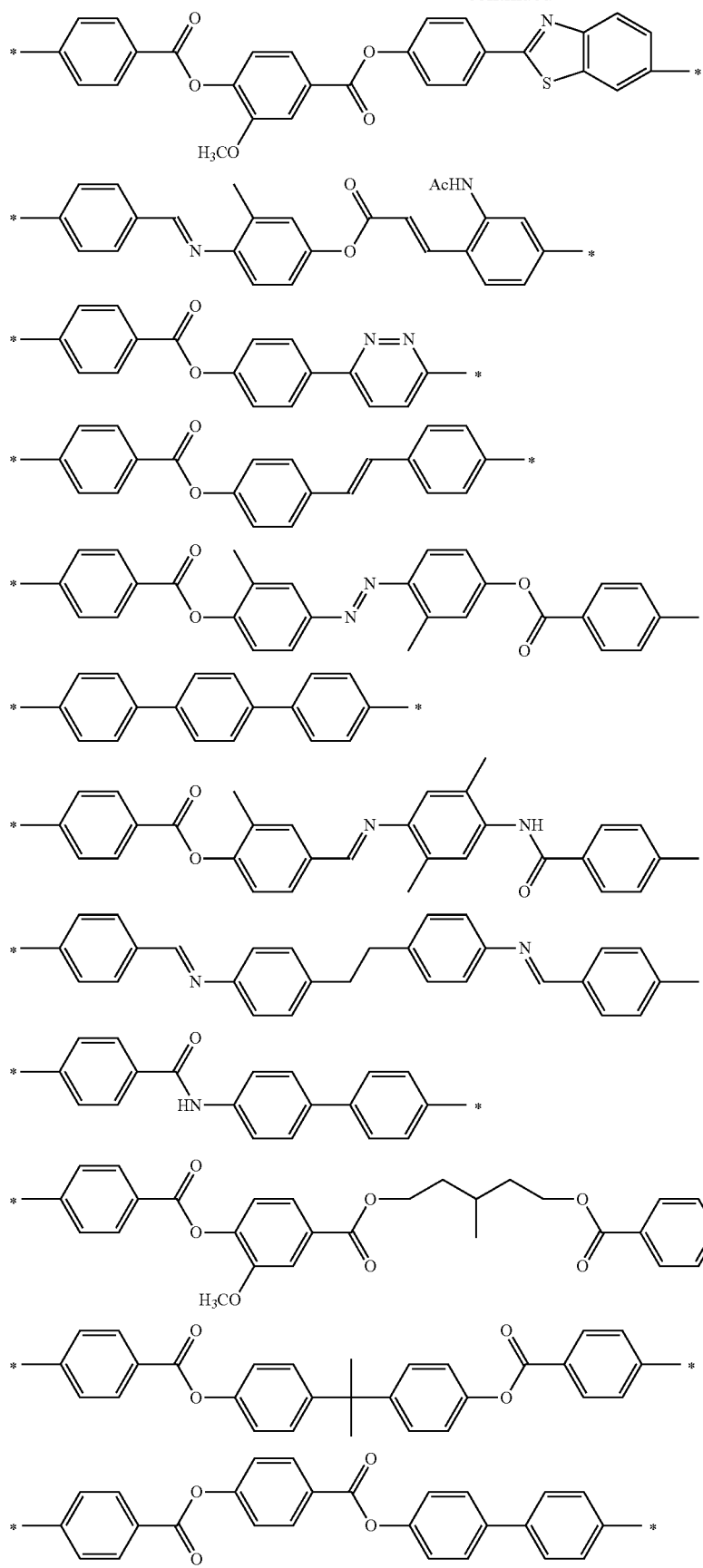

-continued
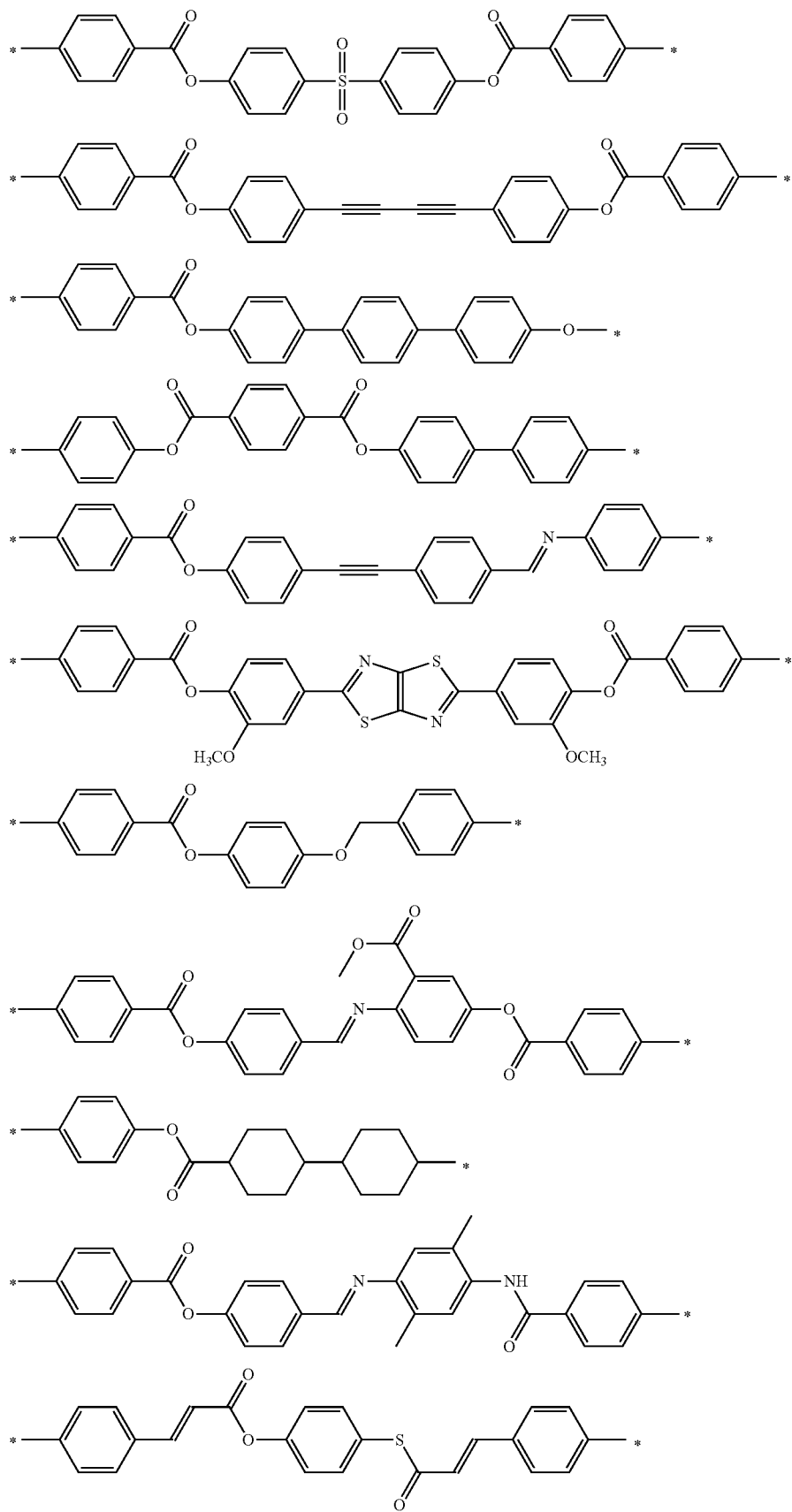

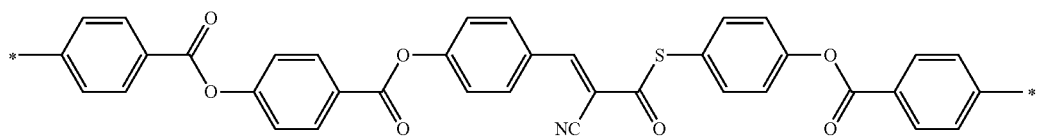

The spacer group represented by SP2 is preferably a single bond or a linear or branched alkylene group having 2 to 20 carbon atoms. The alkylene group may include —O—, —O—CO—, —CO—O—, or —O—CO—O—.

Among these, a single bond is preferable as the spacer group represented by SP2 from the viewpoint that the alignment degree of alight absorption anisotropic film is further increased. In other words, the repeating unit 1 preferably has a structure in which EWG, that is an electron-withdrawing group in Formula (1), is directly connected to M, that is a mesogenic group in Formula (1). It is presumed that in a case where the electron-withdrawing group is directly connected to the mesogenic group, the intermolecular interaction due to the appropriate dipole moment more effectively acts in the polymer liquid crystalline compound, and thus the liquid crystal alignment direction becomes more uniform, and as a result, it is thought that the degree of order of the liquid crystal is increased, and the alignment degree is further increased.

EWG represents an electron-withdrawing group having a σp value greater than 0. Examples of the electron-withdrawing group having a σp value greater than 0 include an ester group (specifically, a group represented by *—C(O)O—$R^E$), a (meth)acryloyl group, a (meth)acryloyloxy group, a carboxy group, a cyano group, a nitro group, a sulfo group, —S(O)(O)—$OR^E$, —S(O)(O)—$R^E$, —O—S(O)(O)—$R^E$, an acyl group (specifically, a group represented by *—C(O)$R^E$), an acyloxy group (specifically, a group represented by *—OC(O)$R^E$), an isocyanate group (—N=C(O)), *—C(O)N($R^F$)$_2$, a halogen atom, and an alkyl group (preferably having 1 to 20 carbon atoms) substituted by the above groups. In each of the groups, * represents a bonding position to SP3. $R^E$ represents an alkyl group having 1 to 20 carbon atoms (preferably 1 to 4 carbon atoms, and more preferably 1 to 2 carbon atoms). $R^F$ each independently represent a hydrogen atom or an alkyl group having 1 to 20 carbon atoms (preferably 1 to 4 carbon atoms, and more preferably 1 to 2 carbon atoms).

Among the groups, EWG is preferably a group represented by *—C(O)O—$R^E$, a (meth)acryloyloxy group, or a cyano group from the viewpoint that the effects of the present invention are further exhibited.

The content of the repeating unit 1 is preferably 40 mass % or less, more preferably 30 mass % or less, and particularly preferably 25 mass % or less with respect to a total mass (100 mass %) of the polymer liquid crystalline compound from the viewpoint that the alignment degree of a light absorption anisotropic film can be kept high, and the polymer liquid crystalline compound and the dichroic substance can be uniformly aligned.

The lower limit of the content of the repeating unit 1 is preferably 1 mass % or greater, and more preferably 5 mass % or greater with respect to a total mass (100 mass %) of the polymer liquid crystalline compound from the viewpoint that the effects of the present invention are further exhibited.

In the present invention, the content of each repeating unit contained in the polymer liquid crystalline compound is calculated based on the amount (mass) of each monomer used for obtaining each repeating unit.

The polymer liquid crystalline compound may contain only one kind of repeating unit 1 or two or more kinds of repeating unit 1. Containing two or more kinds of repeating units 1 in the polymer liquid crystalline compound is advantageous in that the solubility of the polymer liquid crystalline compound in a solvent is improved and the liquid crystal phase transition temperature is easily adjusted. In a case where two or more kinds of repeating units 1 are contained, the total amount thereof is preferably within the above range.

In a case where two or more kinds of repeating units 1 are contained, a repeating unit 1 in which EWG does not include a polymerizable group and a repeating unit 1 in which EWG includes a polymerizable group may be used in combination. This further improves the curability of a light absorption anisotropic film. Specific examples of the polymerizable group include an ethylenically unsaturated bond group (for example, an acryloyl group, a methacryloyl group, an acryloyloxy group, a methacryloyloxy group, a vinyl group, a styryl group, and an allyl group).

In this case, from the viewpoint of a balance between the curability and the alignment degree of a light absorption anisotropic film, the content of the repeating unit 1 in which EWG includes a polymerizable group is preferably 1 to 30 mass % with respect to a total mass of the polymer liquid crystalline compound.

Although examples of the repeating unit 1 are shown below, the repeating unit 1 is not limited to the following repeating units.

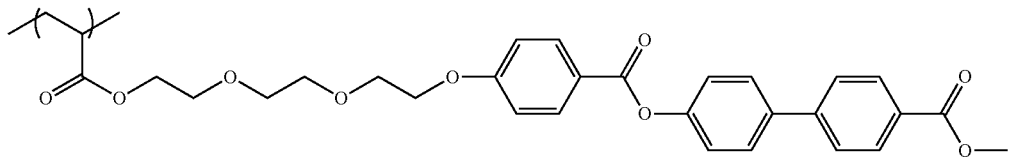

-continued
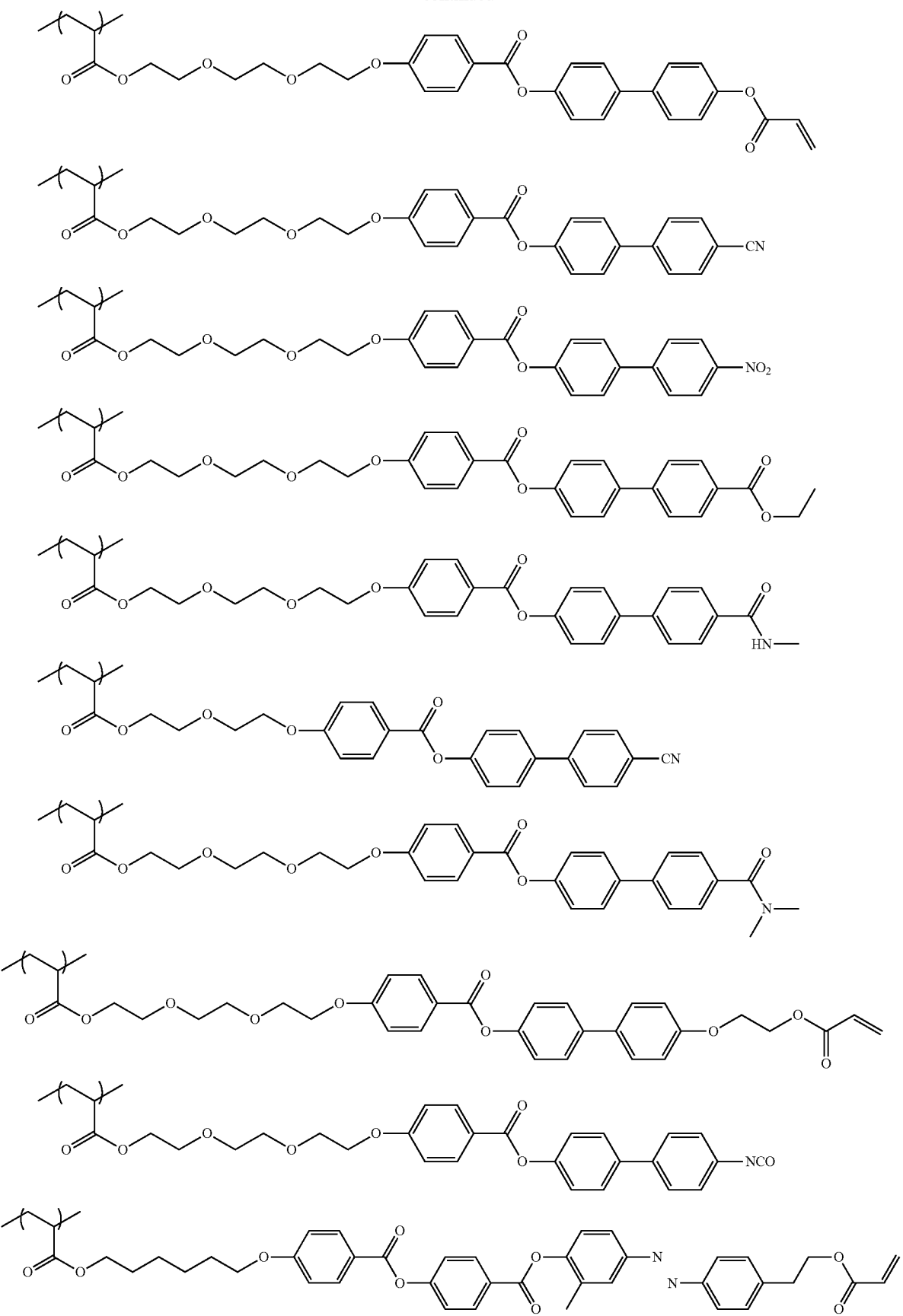

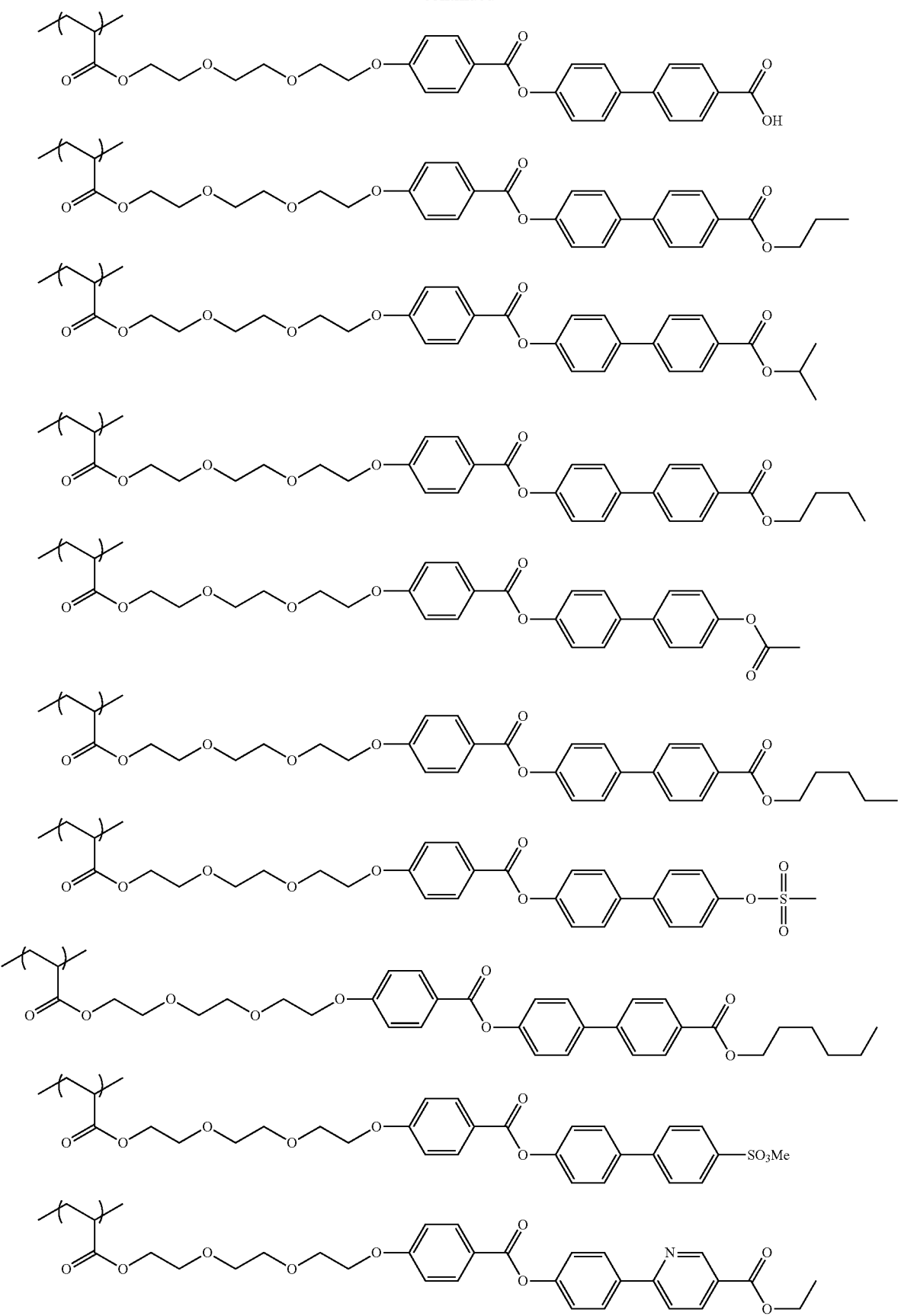

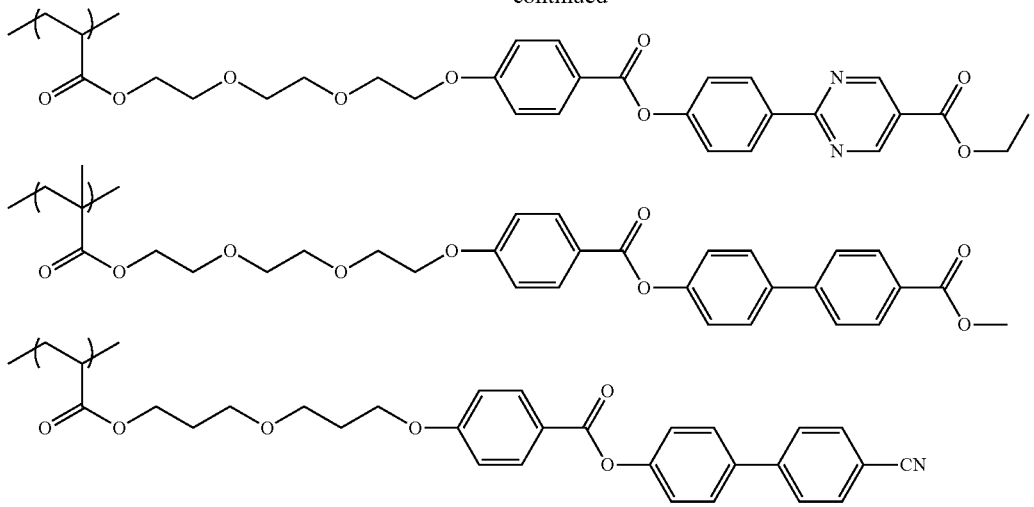

The present inventors have conducted intensive studies on the compositions (content ratios) of the repeating units 1 and 2 and the electron-donating property and the electron-withdrawing property of the terminal groups of the repeating units 1 and 2, and as a result, found that in a case where the electron-withdrawing group of the repeating unit 1 has a strong electron-withdrawing property (that is, in a case where the σp value is large), the alignment degree of a light absorption anisotropic film is further increased by reducing the content ratio of the repeating unit 1, and in a case where the electron-withdrawing group of the repeating unit 1 has a weak electron-withdrawing property (that is, in a case where the σp value is close to 0), the alignment degree of a light absorption anisotropic film is further increased by increasing the content ratio of the repeating unit 1.

The reason for this is not clear in detail, but roughly presumed as follows. That is, it is presumed that since the intermolecular interaction due to the appropriate dipole moment acts in the polymer liquid crystalline compound, the liquid crystal alignment direction becomes more uniform, and as a result, it is thought that the degree of order of the liquid crystal is increased, and the alignment degree of a light absorption anisotropic film is further increased.

Specifically, the product of the σp value of the electron-withdrawing group (EWG in Formula (1)) in the repeating unit 1 and the content ratio (based on mass) of the repeating unit 1 in the polymer liquid crystalline compound is preferably 0.02 to 0.15, more preferably 0.050 to 0.130, and particularly preferably 0.055 to 0.125. In a case where the above product is within the above range, the alignment degree of a light absorption anisotropic film is further increased.

<Repeating Unit 2>

The repeating unit 2 has a mesogenic group and a group having a σp value of 0 or less at a terminal of the mesogenic group. In a case where the polymer liquid crystalline compound has the repeating unit 2, the polymer liquid crystalline compound and the dichroic substance can be uniformly aligned.

The mesogenic group is a group showing the main skeleton of liquid crystal molecules contributing to the formation of liquid crystal. Details thereof are as described in the description of M2 of Formula (2) to be described later, and specific examples thereof are also the same.

The above group is a group positioned at the terminal of the mesogenic group and having a σp value of 0 or less. Examples of the above group (a group having a σp value of 0 or less) include a hydrogen atom having a σp value of 0 and a group (electron-donating group) having a σp value less than 0 and represented by T1 in Formula (2) to be described later. Among the above groups, specific examples of the group (electron-donating group) having a σp value less than 0 are the same as in the case of T1 in Formula (2) to be described later.

The σp value of the above group is 0 or less, and is preferably less than 0, more preferably −0.1 or less, and particularly preferably −0.2 or less from the viewpoint of more excellent alignment uniformity. The lower limit of the σp value of the above group is preferably −0.9 or greater, and more preferably −0.7 or greater.

The repeating unit 2 is not particularly limited as long as it has, in a side chain, a mesogenic group and a group having a σp value of 0 or less at a terminal of the mesogenic group, and from the viewpoint that the uniformity in the liquid crystal alignment is further increased, the repeating unit 2 does not correspond to the repeating unit represented by Formula (1), and is preferably a repeating unit represented by Formula (2).

(2)

In Formula (2), P2 represents a main chain of the repeating unit, L2 represents a single bond or a divalent linking group, SP3 represents a spacer group, M2 represents a mesogenic group having three or more cyclic structures, and T1 represents an electron-donating group having a Hammett's substituent constant σp of less than 0.

Since specific examples of the main chain of the repeating unit represented by P2 and preferable aspects thereof are the same as those in the case of P1 in Formula (1), the description thereof will be omitted.

Since specific examples of the divalent linking group represented by L2 and preferable aspects thereof are the same as those in the case of L1 in Formula (1), the description thereof will be omitted.

Since specific examples of the spacer group represented by SP3 and preferable aspects thereof are the same as those in the case of SP in Formula (1), the description thereof will be omitted.

The mesogenic group represented by M2 is a group showing the main skeleton of liquid crystal molecules contributing to the formation of liquid crystal. The liquid crystal molecules exhibit liquid crystallinity in an intermediate state (mesophase) between a crystalline state and an isotropic liquid state. The mesogenic group is not particularly limited, and for example, the description on pages 7 to 16 of "Flussige Kristalle in Tabellen II" (VEB Deutsche Verlag fur Grundstoff Industrie, Leipzig, 1984) and the description in Chapter 3 of Liquid Crystal Handbook (Maruzen, 2000) edited by Liquid Crystal Handbook Editing Committee can be referred to.

The mesogenic group represented by M2 is a group having three or more cyclic structures, and is preferably a group having 3 to 5 cyclic structures, and more preferably a group having 3 or 4 cyclic structures. In a case where the mesogenic group represented by M2 has three or more cyclic structures, the heat resistance of a light absorption anisotropic film is improved. In a case where the mesogenic group represented by M2 has four or less cyclic structures, solubility in an organic solvent is improved.

Examples of the group having a cyclic structure include at least one selected from the group consisting of an aromatic hydrocarbon group, a heterocyclic group, and an alicyclic group. Among these, the mesogenic group represented by M2 preferably has an aromatic hydrocarbon group, and is more preferably a group in which all groups having a cyclic structure are aromatic hydrocarbon groups from the viewpoint that the effects of the present invention are further enhanced.

The mesogenic group represented by M2 is preferably a group represented by Formula (M2-A) or (M2-B), and more preferably a group represented by Formula (M2-B) from the viewpoint of exhibition of liquid crystallinity, adjustment of a liquid crystal phase transition temperature, raw material availability, synthesis suitability, and from the reason for further enhancing the effects of the present invention.

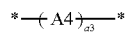
(M2-A)

(M2-B)

In Formula (M2-A), A4 is a divalent group selected from the group consisting of an aromatic hydrocarbon group, a heterocyclic group, and an alicyclic group. These groups may be substituted by a substituent such as an alkyl group, a fluorinated alkyl group, an alkoxy group, or a substituent W to be described later.

The divalent group represented by A4 is preferably a 4- to 6-membered ring. The divalent group represented by A4 may be monocyclic or condensed.

* represents a bonding position to SP3 or T1.

Examples of the divalent aromatic hydrocarbon group represented by A4 include a phenylene group, a naphthylene group, a fluorene-diyl group, an anthracene-diyl group, and a tetracene-diyl group, and from the viewpoint of diversity of the design of a mesogenic skeleton and raw material availability, a phenylene group or a naphthylene group is preferable, and a phenylene group is more preferable.

The divalent heterocyclic group represented by A4 may be aromatic or non-aromatic, and is preferably a divalent aromatic heterocyclic group from the viewpoint of a further improvement in the alignment degree.

Examples of the atoms other than the carbon atom of the divalent aromatic heterocyclic group include a nitrogen atom, a sulfur atom, and an oxygen atom. In a case where the aromatic heterocyclic group has a plurality of ring-constituting atoms other than the carbon atom, these may be the same or different.

Specific examples of the divalent aromatic heterocyclic group include a pyridylene group (pyridine-diyl group), a pyridazine-diyl group, an imidazole-diyl group, a thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimide-diyl group, a thienothiazole-diyl group, a thiazolothiazole-diyl group, a thienothiophene-diyl group, and a thienooxazole-diyl group.

Specific examples of the divalent alicyclic group represented by A4 include a cyclopentylene group and a cyclohexylene group.

In Formula (M2-A), a3 represents an integer of 3 to 10. A plurality of A4's may be the same or different.

In Formula (M2-B), A5 and A6 each independently represent a divalent group selected from the group consisting of an aromatic hydrocarbon group, a heterocyclic group, and an alicyclic group. Since specific examples and preferable aspects of A5 and A6 are the same as those in the case of A4 of Formula (M2-A), the description thereof will be omitted.

In Formula (M2-B), a4 represents an integer of 2 to 10, a plurality of A5's may be the same or different, and a plurality of LA2's may be the same or different.

In Formula (M2-B), a plurality of LA2's each independently represent a single bond or a divalent linking group, and at least one of the plurality of LA2's is a divalent linking group. In a case where a4 is 2, it is preferable that one of two LA2's is a divalent linking group and the other is a single bond since the effects of the present invention are further enhanced.

Examples of the divalent linking group represented by LA2 in Formula (M2-B) include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (Z,Z',Z" each independently represent hydrogen, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. Among these, —C(O)O— is preferable since the effects of the present invention are further enhanced. LA2 may be a group formed by combining two or more of the above groups.

Specific examples of M2 include the following structures. In the following specific examples, "Ac" represents an acetyl group.

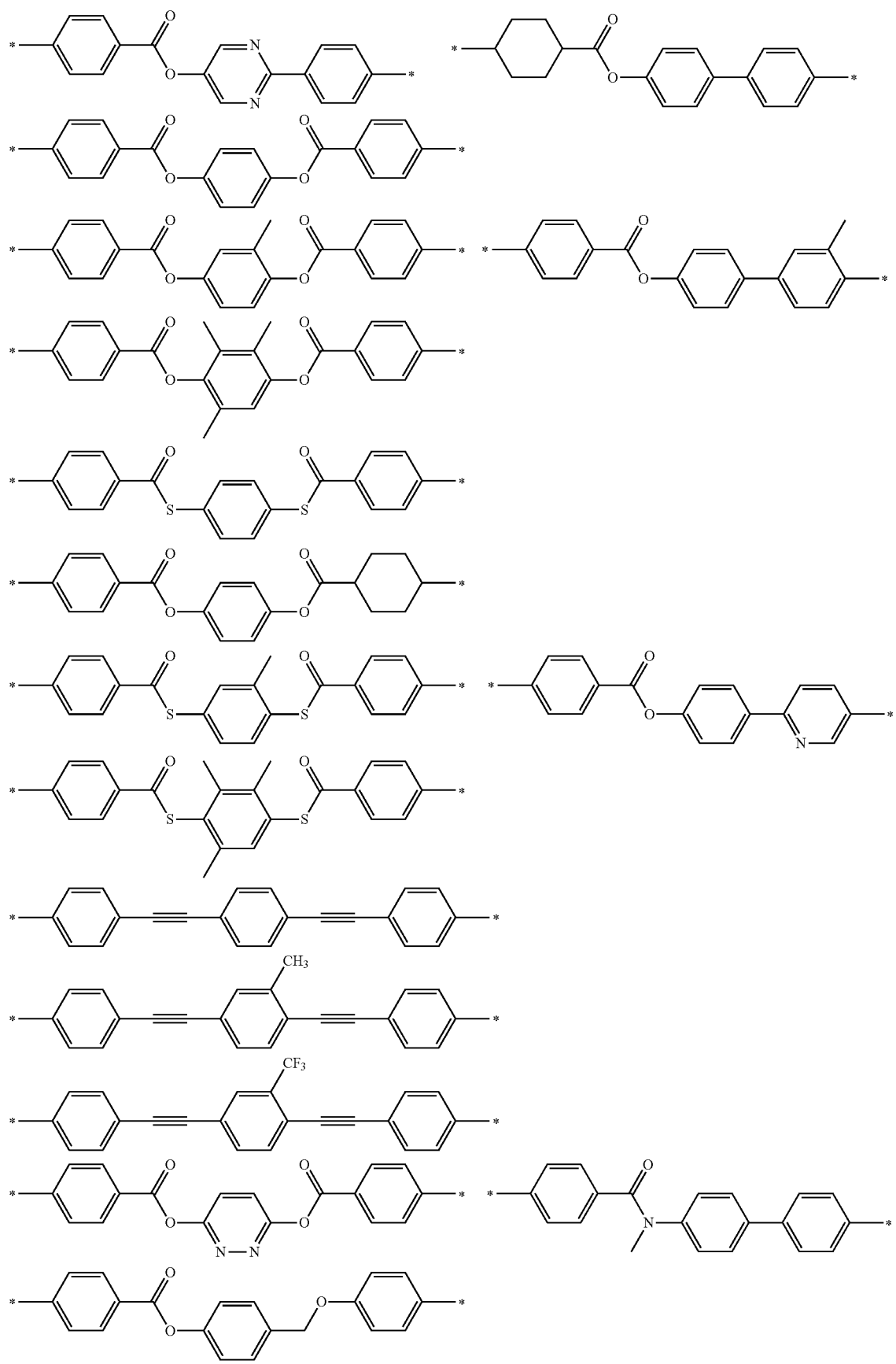

31
-continued
32
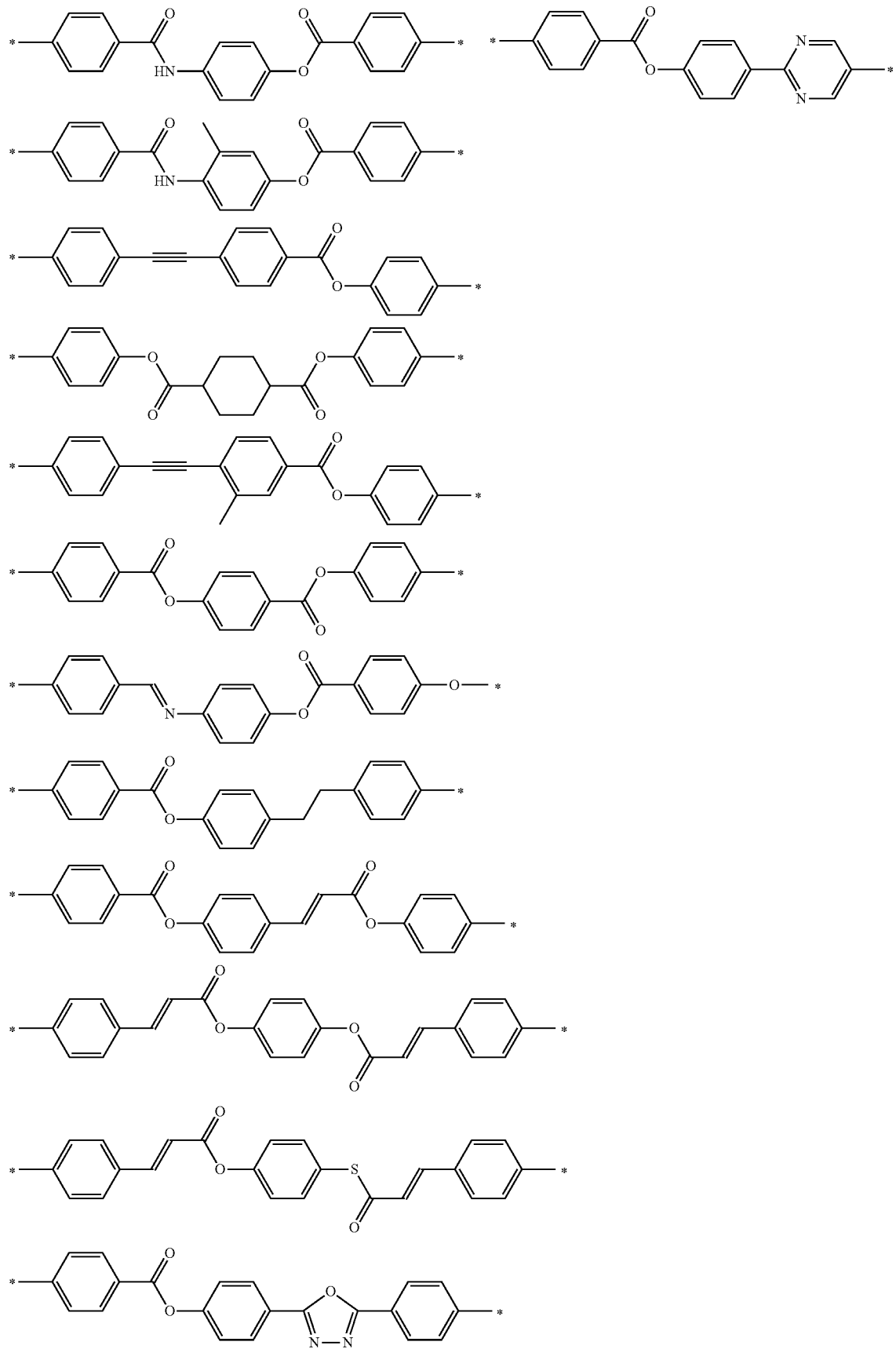

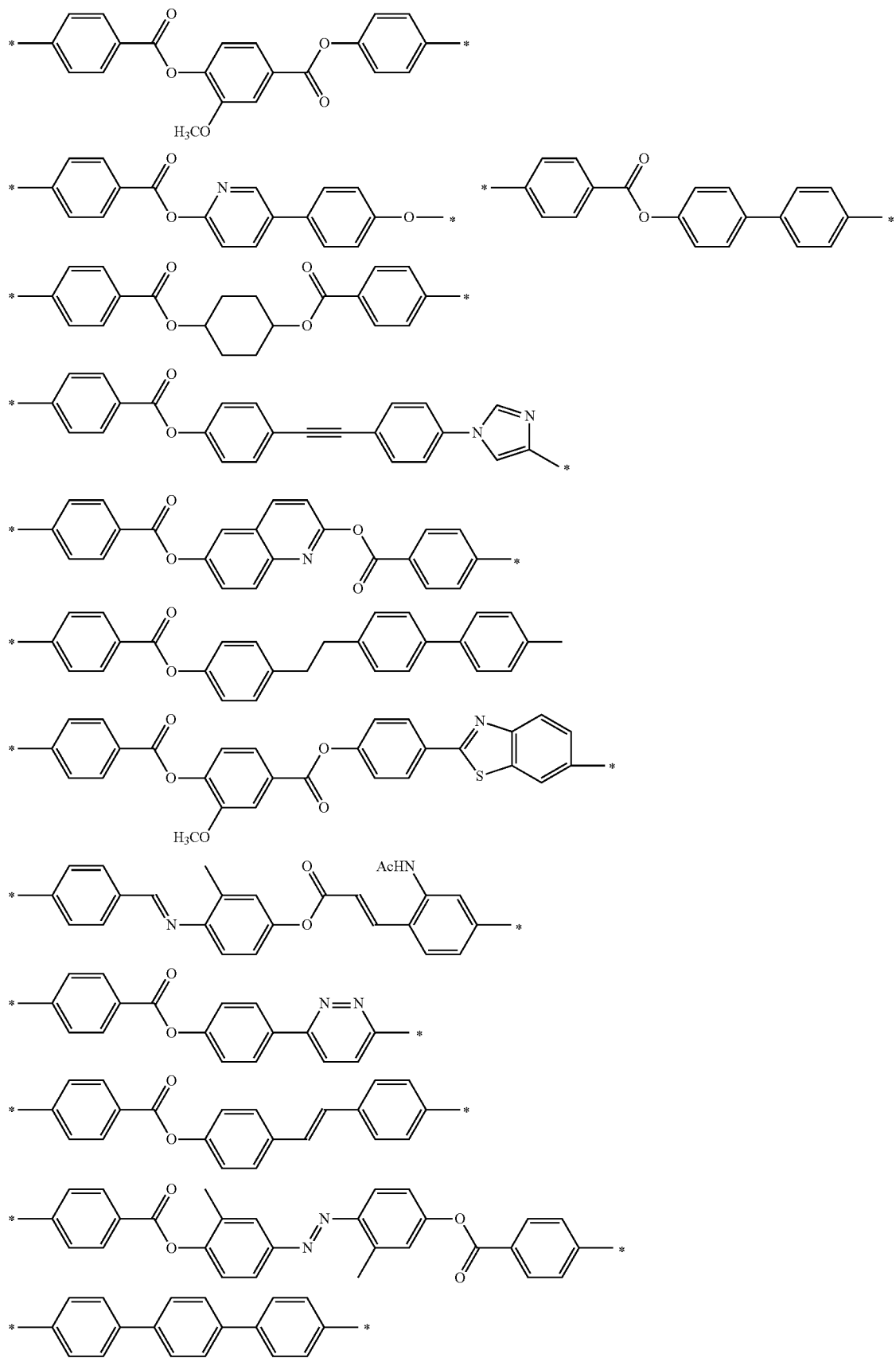

-continued
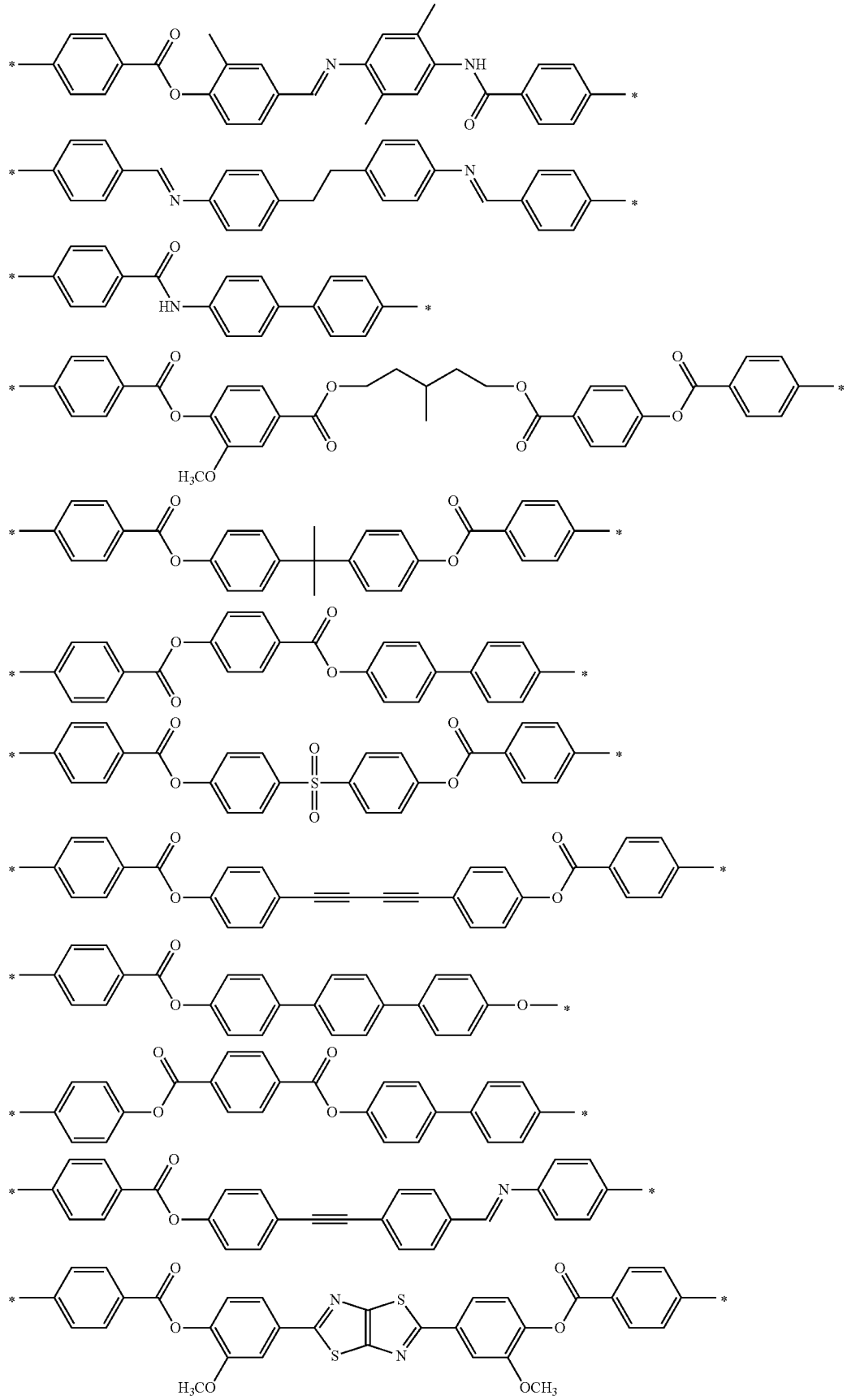

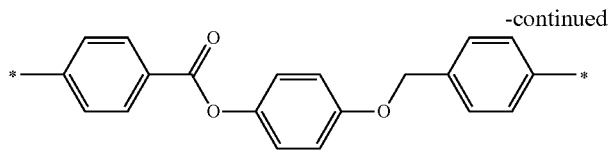

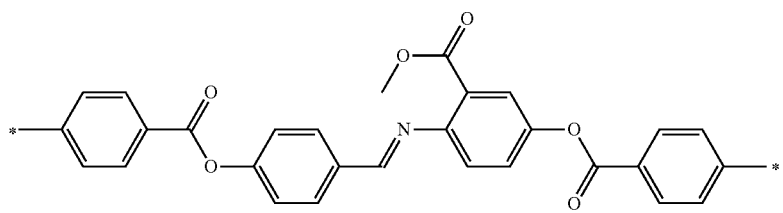

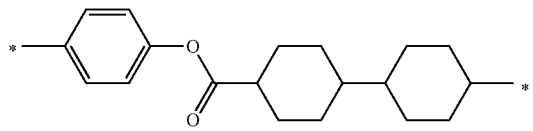

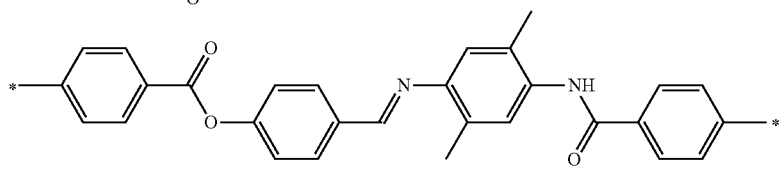

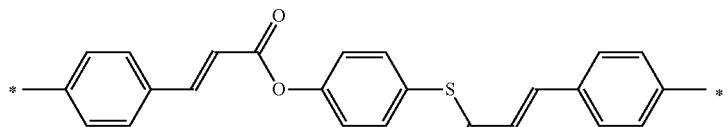

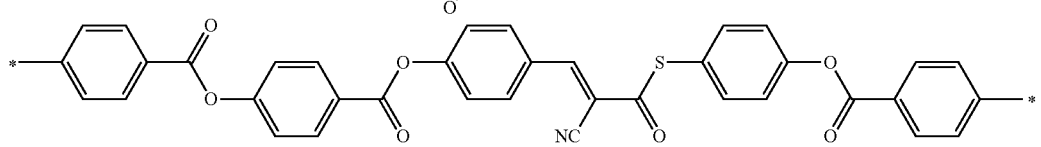

T1 represents an electron-donating group having a σp value less than 0. Examples of the electron-donating group having a σp value less than 0 include a hydroxy group, an alkyl group having 1 to 10 carbon atoms, an alkoxy group having 1 to 10 carbon atoms, and an alkylamino group having 1 to 10 carbon atoms.

In a case where the number of atoms in the main chain of T1 is 20 or less, the alignment degree of alight absorption anisotropic film is further improved. Here, the "main chain" of T1 means the longest molecular chain bonded to M2, and hydrogen atoms are not counted as the number of atoms in the main chain of T1. For example, in a case where T1 is an n-butyl group, the main chain has 4 atoms, and in a case where T1 is a sec-butyl group, the main chain has 3 atoms.

Although examples of the repeating unit 2 are shown below, the repeating unit 2 is not limited to the following repeating units.

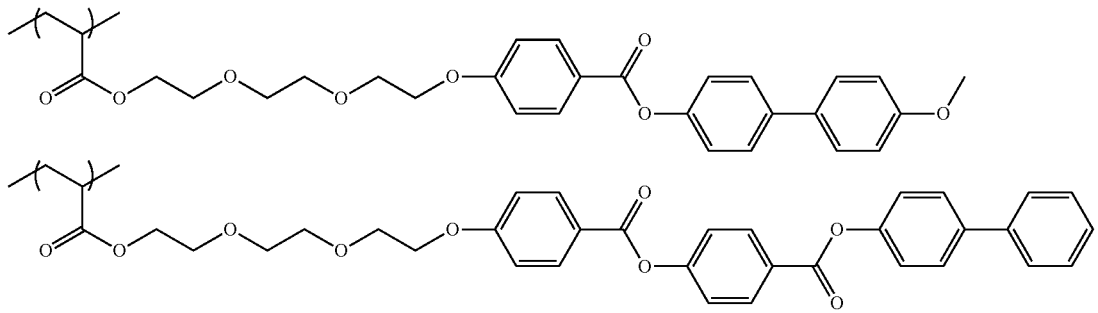

-continued
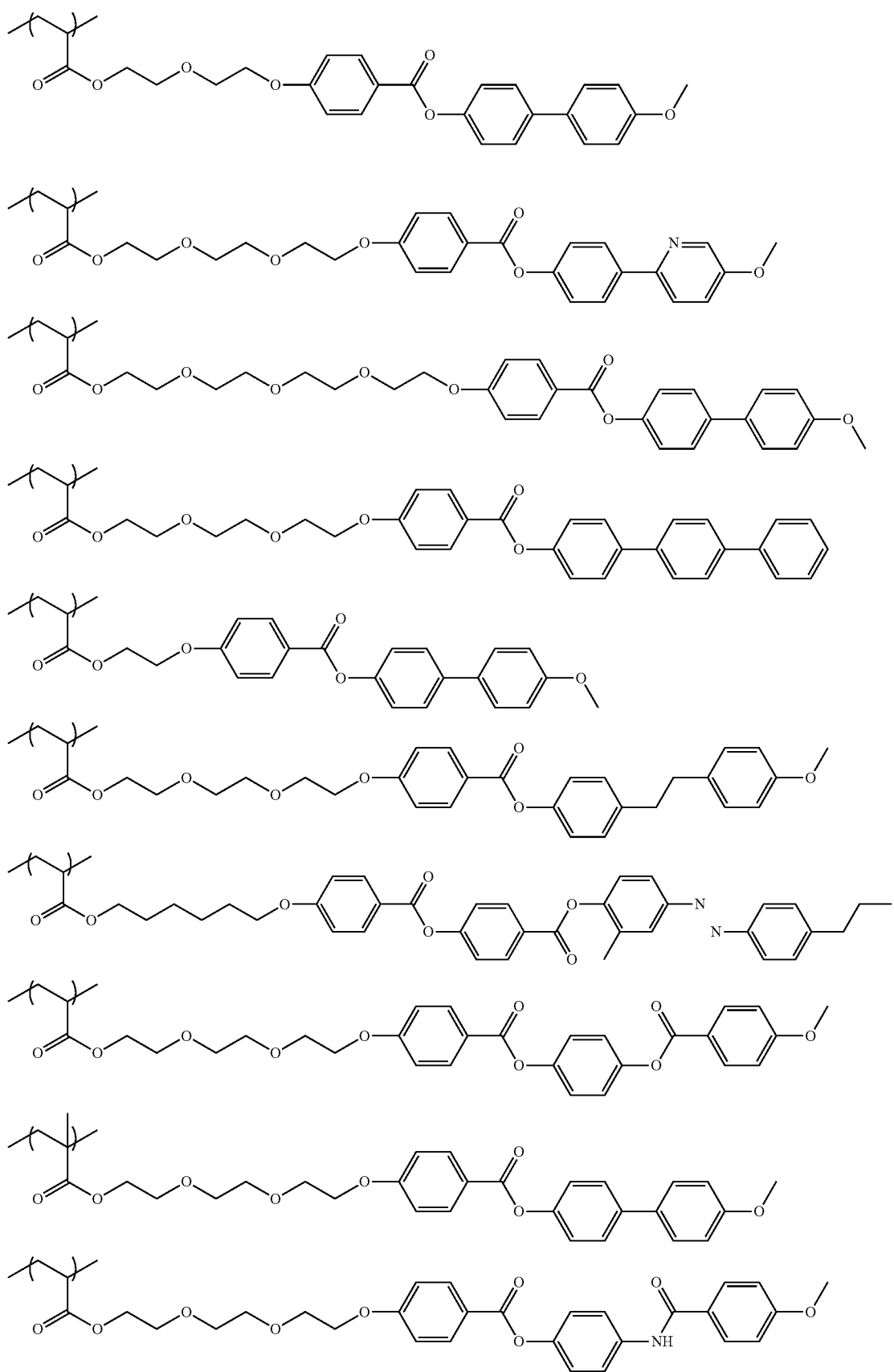

-continued

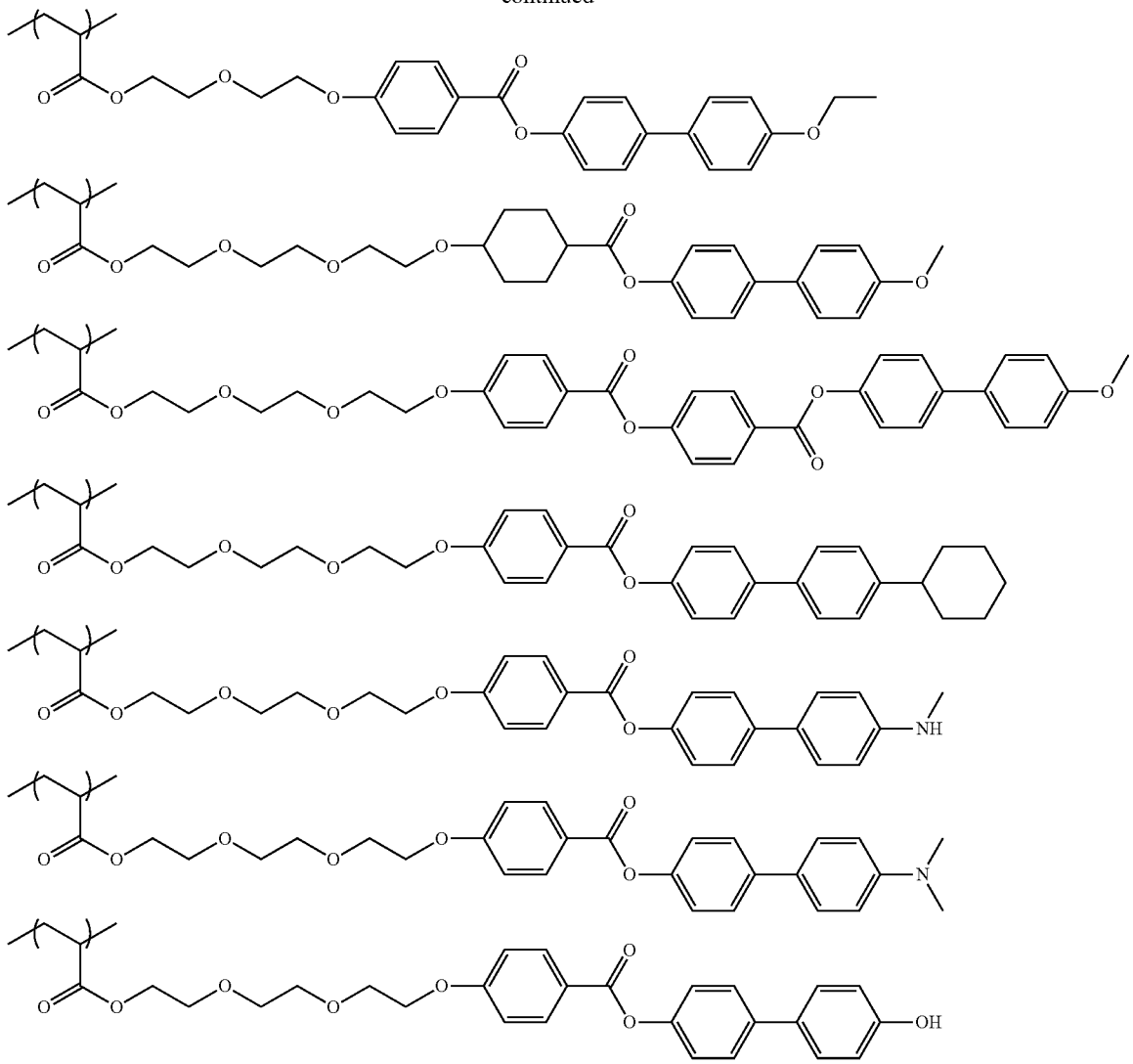

Preferably, a part of the structure of the repeating unit 1 is in common with apart of the structure of the repeating unit 2. It is presumed that the more similar the structures of the repeating units are, the more uniformly the liquid crystal is aligned. Accordingly, the alignment degree of alight absorption anisotropic film is further increased.

Specifically, from the viewpoint that the alignment degree of alight absorption anisotropic film is further increased, it is preferable that at least one of the fact that SP1 of Formula (1) and SP3 of Formula (2) have the same structure, the fact that M1 of Formula (1) and M2 of Formula (2) have the same structure, and the fact that L1 of Formula (1) and L2 of Formula (2) have the same structure is satisfied, it is more preferable that two or more of the facts are satisfied, and it is particularly preferable that all the facts are satisfied.

The content of the repeating unit 2 is preferably 60 mass % or greater, more preferably 70 mass % or greater, and particularly preferably 75 mass % or greater with respect to a total mass (100 mass %) of the polymer liquid crystalline compound from the viewpoint of excellent alignment uniformity.

The upper limit of the content of the repeating unit 2 is preferably 99 mass % or less, and more preferably 95 mass % or less from the viewpoint of an improvement in the alignment degree.

The polymer liquid crystalline compound may contain only one kind of repeating unit 2 or two or more kinds of repeating units 2. Containing two or more kinds of repeating units 2 in the polymer liquid crystalline compound is advantageous in that the solubility of the polymer liquid crystalline compound in a solvent is improved and the liquid crystal phase transition temperature is easily adjusted. In a case where two or more kinds of repeating units 2 are contained, the total amount thereof is preferably within the above range.

<Physical Properties>

A weight-average molecular weight (Mw) of the polymer liquid crystalline compound is preferably 1,000 to 500,000, and more preferably 2,000 to 300,000. In a case where Mw of the polymer liquid crystalline compound is within the above range, handling of the polymer liquid crystalline compound is facilitated.

Here, in the present invention, the weight-average molecular weight and the number-average molecular weight are values measured by gel permeation chromatography (GPC).

Solvent (eluant): N-methylpyrrolidone
Device Name: TOSOH HLC-8220GPC
Column: Three columns (TOSOH TSKgelSuperAWM-H (6 mm×15 cm)) are connected and used.
Column Temperature: 25° C.
Sample Concentration: 0.1 mass %
Flow Rate: 0.35 mL/min
Calibration Curve: Using a calibration curve obtained using 7 TSK standard polystyrene samples manufactured by TOSOH Corporation Mw=2,800,000 to 1,050 (Mw/Mn=1.03 to 1.06)

The liquid crystallinity of the polymer liquid crystalline compound may be either nematic or smectic, but is preferably at least nematic.

The temperature range in which a nematic phase is exhibited is preferably room temperature (23° C.) to 450° C., and is preferably 50° C. to 400° C. from the viewpoint of handling and manufacturing suitability.

The side chain type polymer liquid crystalline compound according to the embodiment of the present invention is a copolymer having a repeating unit 1 represented by Formula (1) and a repeating unit 2 represented by Formula (2), and M1 of Formula (1) and M2 of Formula (2) have the same structure. Since details of each repeating unit in the side chain type polymer liquid crystalline compound according to the embodiment of the present invention are the same as those of the polymer liquid crystalline compound contained in the above-described liquid crystalline composition according to the embodiment of the present invention, the description thereof will be omitted.

<Substituent W>

The substituent W in this specification will be described.

Examples of the substituent W include a halogen atom, an alkyl group (for example, a tert-butyl group) (including a cycloalkyl group, a bicycloalkyl group, and a tricycloalkyl group), an alkenyl group (including a cycloalkenyl group and a bicycloalkenyl group), an alkynyl group, an aryl group, a heterocyclic group (may be referred to as a heterocyclic group), a cyano group, a hydroxy group, a nitro group, a carboxy group, an alkoxy group, an aryloxy group, a silyloxy group, a heterocyclicoxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclicthio group, a sulfamoyl group, a sulfo group, an alkyl- or arylsulfinyl group, an alkyl- or arylsulfonyl group, an acyl group, an aryloxycarbonyl group, an alkoxycarbonyl group a carbamoyl, an aryl- or heterocyclic azo group, an imide group, a phosphino group, a phosphinyl group, a phosphinyloxy group, a phosphinylamino group, a phosphono group, a silyl group, a hydrazino group, an ureido group, a boronic acid group (—B(OH)$_2$), a phosphato group (—OPO(OH)$_2$), a sulfato group (—OSO$_3$H), and other known substituents.

Details of the substituent are described in a paragraph [0023] of JP2007-234651A.

[Dichroic Substance]

The dichroic substance contained in the liquid crystalline composition according to the embodiment of the present invention is not particularly limited, and examples thereof include visible light absorbing substances (dichroic dye), light emitting substances (fluorescent substance, phosphorescent substance), ultraviolet absorbing substances, infrared absorbing substances, nonlinear optical substances, carbon nanotubes, and inorganic substances (for example, quantum rods). Dichroic substances (dichroic dyes) which have been known can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-014883A, paragraphs [0012] to [0029] of JP2013-109090A, paragraphs [0009] to [0017] of JP2013-101328A, paragraphs [0051] to [0065] of JP2013-037353A, paragraphs [0049] to [0073] of JP2012-063387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, and paragraphs [0014] to [0034] of WO2018/164252A.

In the present invention, two or more kinds of dichroic substances may be used in combination. For example, from the viewpoint of making a color of the light absorption anisotropic film close to black, at least one kind of dye compound having a maximum absorption wavelength in a wavelength range of 370 to 550 nm, and at least one kind of dye compound having a maximum absorption wavelength in a wavelength range of 500 to 700 nm are preferably used in combination.

In the present invention, the dichroic substance preferably has a crosslinking group since the pressing resistance is further improved.

Specific examples of the crosslinking group include a (meth)acryloyl group, an epoxy group, an oxetanyl group, and a styryl group, and among these, a (meth)acryloyl group is preferable.

In the present invention, the content of the dichroic substance is preferably 2 to 400 parts by mass, more preferably 3 to 300 parts by mass, and particularly preferably 4 to 200 parts by mass with respect to 100 parts by mass of the polymer liquid crystalline compound from the viewpoint of an improvement in the balance between the alignment degree and the uniformity of a light absorption anisotropic film.

[Polymerization Initiator]

The liquid crystalline composition used in the present invention preferably contains a polymerization initiator.

The polymerization initiator is not particularly limited, and a photosensitive compound, that is, a photopolymerization initiator is preferable.

As the photopolymerization initiator, various kinds of compounds can be used with no particular limitation. Examples of the photopolymerization initiator include a-carbonyl compounds (the specifications of U.S. Pat. Nos. 2,367,661A and 2,367,670A), acyloin ethers (the specification of U.S. Pat. No. 2,448,828A), aromatic acyloin compounds substituted by a-hydrocarbon (the specification of U.S. Pat. No. 2,722,512A), polynuclear quinone compounds (the specifications of U.S. Pat. Nos. 3,046,127A and 2,951,758A), combinations of triarylimidazole dimers and p-aminophenyl ketones (the specification of U.S. Pat. No. 3,549,367A), acridine and phenazine compounds (the specifications of JP1985-105667A (JP-S60-105667A) and U.S. Pat. No. 4,239,850A), oxadiazole compounds (the specification of U.S. Pat. No. 4,212,970A), and acylphosphine oxide compounds (JP1988-040799B (JP-S63-040799B), JP1993-029234B (JP-H5-029234B), JP1998-095788B (JP-H10-095788B), and JP1998-029997B (JP-H10-029997B)).

A commercially available product can also be used as the photopolymerization initiator, and examples thereof include IRGACURE 184, 907, 369, 651, 819, OXE-01, and OXE-02 manufactured by BASF SE.

In a case where the liquid crystalline composition according to the embodiment of the present invention contains a polymerization initiator, the content of the polymerization initiator is preferably 0.01 to 30 parts by mass, and preferably 0.1 to 15 parts by mass with respect to a total of 100 parts by mass of the dichroic substance and the polymer liquid crystalline compound in the liquid crystalline composition. In a case where the content of the polymerization initiator is 0.01 parts by mass or greater, the durability of a light absorption anisotropic film is improved, and in a case where the content of the polymerization initiator is 30 parts by mass or less, the alignment of a light absorption anisotropic film is improved.

[Solvent]

From the viewpoint of workability and the like, the liquid crystalline composition according to the embodiment of the present invention preferably contains a solvent.

Examples of the solvent include organic solvents such as ketones (for example, acetone, 2-butanone, methyl isobutyl ketone, cyclopentanone, and cyclohexanone), ethers (for example, dioxane, tetrahydrofuran, 2-methyltetrahydrofuran, cyclopentyl methyl ether, tetrahydropyran, and dioxolan), aliphatic hydrocarbons (for example, hexane), alicyclic hydrocarbons (for example, cyclohexane), aromatic hydrocarbons (for example, benzene, toluene, xylene, and trimethylbenzene), halogenated carbons (for example, dichloromethane, trichloromethane, dichloroethane, dichlorobenzene, and chlorotoluene), esters (for example, methyl acetate, ethyl acetate, butyl acetate, and ethyl lactate), alcohols (for example, ethanol, isopropanol, butanol, cyclohexanol, isopentyl alcohol, neopentyl alcohol, diacetone alcohol, and benzyl alcohol), cellosolves (for example, methyl cellosolve, ethyl cellosolve, and 1,2-dimethoxyethane), cellosolve acetates, sulfoxides (for example, dimethyl sulfoxide), amides (for example, dimethylformamide, dimethylacetamide, N-methylpyrrolidone, and N-ethylpyrrolidone), and heterocyclic compounds (for example, pyridine), and water. These solvents may be used alone or in combination of two or more kinds thereof.

In a case where the liquid crystalline composition according to the embodiment of the present invention contains a solvent, the content of the solvent is preferably 80 to 99 mass %, more preferably 83 to 98 mass %, and particularly preferably 85 to 96 mass % with respect to the total mass of the liquid crystalline composition.

[Interface Improver]

The liquid crystalline composition according to the embodiment of the present invention preferably contains an interface improver. Due to the interface improver contained, the smoothness of the coating surface is improved, and the alignment degree is improved or cissing and unevenness are suppressed. Thus, an improvement in the in-plane uniformity is anticipated.

As the interface improver, a material making the liquid crystalline compound horizontal on the coating surface side is preferable, and the compounds (horizontal alignment agents) described in paragraphs [0253] to [0293] of JP2011-237513A can be used. The fluorine (meth)acrylate-based polymers described in paragraphs [0018] to [0043] of JP2007-272185A and the like can also be used. Other compounds may also be used as the interface improver.

In a case where the liquid crystalline composition according to the embodiment of the present invention contains an interface improver, the content of the interface improver is preferably 0.001 to 5 parts by mass, and preferably 0.01 to 3 parts by mass with respect to a total of 100 parts by mass of the dichroic substance and the polymer liquid crystalline compound in the liquid crystalline composition.

[Light Absorption Anisotropic Film]

The light absorption anisotropic film according to the embodiment of the present invention is formed using the above-described liquid crystalline composition according to the embodiment of the present invention.

Examples of the method of manufacturing the light absorption anisotropic film according to the embodiment of the present invention include a method including, in order, a step of forming a coating film by applying the liquid crystalline composition to a base (hereinafter, also referred to as "coating film forming step") and a step of aligning a dichroic substance contained in the coating film (hereinafter, also referred to as "alignment step").

Hereinafter, the respective steps of the method of manufacturing the light absorption anisotropic film according to the embodiment of the present invention will be described.

[Coating Film Forming Step]

The coating film forming step is a step of forming a coating film by applying the liquid crystalline composition to a base.

By using a liquid crystalline composition containing the above-described solvent, or a liquid material such as a molten liquid obtained by heating the liquid crystalline composition, the liquid crystalline composition is easily applied to the base.

Examples of the method of applying the liquid crystalline composition include known methods such as a roll coating method, a gravure printing method, a spin coating method, a wire bar coating method, an extrusion coating method, a direct gravure coating method, a reverse gravure coating method, a die-coating method, a spray method, and an ink jet method.

In this aspect, an example has been given in which the liquid crystalline composition is applied to the base, but the present invention is not limited thereto. For example, the liquid crystalline composition may be applied to an alignment film provided on the base. Details of the base and the alignment film will be described later.

[Alignment Step]

The alignment step is a step of aligning a dichroic substance contained in the coating film. Thus, a light absorption anisotropic film is obtained.

The alignment step may have a drying treatment. Through the drying treatment, a component such as a solvent can be removed from the coating film. The drying treatment may be performed by a method of leaving the coating film for a predetermined time at room temperature (for example, natural drying), or a heating and/or air blowing method.

Here, the dichroic substance contained in the liquid crystalline composition may be aligned by the above-described coating film forming step or drying treatment. For example, in an aspect in which the liquid crystalline composition is prepared as a coating liquid containing a solvent, the coating film is dried to remove the solvent from the coating film, and thus a coating film having light absorption anisotropy (that is, light absorption anisotropic film) is obtained.

The alignment step preferably has a heating treatment. Accordingly, the dichroic substance contained in the coating film can be aligned, and thus the coating film after the heating treatment can be preferably used as a light absorption anisotropic film.

The heating treatment is preferably performed at 10° C. to 250° C., and more preferably at 25° C. to 190° C. in view of manufacturing suitability or the like. The heating time is preferably 1 to 300 seconds, and more preferably 1 to 60 seconds.

The alignment step may have a cooling treatment to be performed after the heating treatment. The cooling treatment is a treatment for cooling the coating film after the heating to about room temperature (20° C. to 25° C.). Accordingly, the alignment of the dichroic substance contained in the coating film can be fixed. The cooling unit is not particularly limited, and the cooling can be performed by a known method.

By the above steps, a light absorption anisotropic film can be obtained.

In this aspect, examples of the method of aligning the dichroic substance contained in the coating film include the drying treatment and the heating treatment, but are not limited thereto, and a known alignment treatment can be used.

[Other Steps]

The method of manufacturing a light absorption anisotropic film may have a step of curing the light absorption anisotropic film (hereinafter, also referred to as "curing step") after the alignment step.

For example, the curing step is performed by heating and/or light irradiation (exposure). Among these, light irradiation is preferably performed to conduct the curing step.

As the light source used for curing, various light sources can be used such as infrared rays, visible light, and ultraviolet rays, and ultraviolet rays are preferable. In the curing, ultraviolet rays may be applied during heating, or may be applied via a filter which transmits only a component with a specific wavelength.

In addition, the exposure may be performed under a nitrogen atmosphere. In a case where the light absorption anisotropic film is cured by radical polymerization, inhibition of the polymerization by oxygen is reduced, and thus the exposure is preferably performed under a nitrogen atmosphere.

The film thickness of the light absorption anisotropic film is preferably 0.1 to 5.0 µm, and more preferably 0.3 to 1.5 µm. Although depending on the concentration of the dichroic substance in the liquid crystalline composition, a light absorption anisotropic film having an excellent absorbance is obtained in a case where the film thickness is 0.1 µm or greater, and a light absorption anisotropic film having an excellent transmittance is obtained in a case where the film thickness is 5.0 µm or less.

[Laminate]

A laminate according to the embodiment of the present invention has a base and the light absorption anisotropic film according to the embodiment of the present invention formed on the base.

The laminate according to the embodiment of the present invention may further have $\lambda/4$ plate formed on the light absorption anisotropic film.

In addition, the laminate according to the embodiment of the present invention may have an alignment film between the base and the light absorption anisotropic film.

The laminate according to the embodiment of the present invention may further have a barrier layer between the light absorption anisotropic film and the $\lambda/4$ plate.

Hereinafter, the constituent layers of the laminate according to the embodiment of the present invention will be described.

[Base]

The base can be selected in accordance with usage of the light absorption anisotropic film, and examples thereof include glass and a polymer film. The light transmittance of the base is preferably 80% or greater.

In a case where a polymer film is used as the base, an optically isotropic polymer film is preferably used. As specific examples and preferable aspects of the polymer, those described in a paragraph [0013] of JP2002-022942A can be applied. In addition, even a conventionally known polymer such as polycarbonate or polysulfone in which birefringence is likely to be developed can also be used by reducing the developability through molecular modification described in WO00/026705A.

[Light Absorption Anisotropic Film]

Since the light absorption anisotropic film is as described above, the description thereof will be omitted.

[$\lambda/4$ Plate]

The "$\lambda/4$ plate" is a plate having a $\lambda/4$ function, and is specifically, a plate having a function of converting linearly polarized light with a specific wavelength into circularly polarized light (or converting circularly polarized light into linearly polarized light).

For example, in an aspect in which the $\lambda/4$ plate has a single layer structure, specific examples of the plate include a retardation film in which an optically anisotropic layer having a $\lambda/4$ function is provided on a stretched polymer film or a support. In an aspect in which the $\lambda/4$ plate has a multilayered structure, specific examples of the plate include a broadband $\lambda/4$ plate having a laminate of a $\lambda/4$ plate and a $\lambda/2$ plate.

The $\lambda/4$ plate and the light absorption anisotropic film may be provided in contact with each other, or another layer may be provided between the $\lambda/4$ plate and the light absorption anisotropic film. Examples of the layer include a pressure sensitive adhesive layer or an adhesive layer for securing adhesiveness and a barrier layer.

[Barrier Layer]

In a case where the laminate according to the embodiment of the present invention has a barrier layer, the barrier layer is provided between the light absorption anisotropic film and the $\lambda/4$ plate. In a case where a layer other than the barrier layer (for example, a pressure sensitive adhesive layer or an adhesive layer) is provided between the light absorption anisotropic film and the $\lambda/4$ plate, the barrier layer can be provided between, for example, the light absorption anisotropic film and the above layer other than the barrier layer.

The barrier layer is also called a gas barrier layer (oxygen barrier layer), and has a function of protecting the light absorption anisotropic film from a gas such as oxygen in the atmosphere, moisture, or a compound contained in the adjacent layer.

Regarding the barrier layer, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A can be referred to.

[Alignment Film]

The laminate according to the embodiment of the present invention may have an alignment film between the base and the light absorption anisotropic film.

As the alignment film, any layer may be used as long as it allows the dichroic substance contained in the liquid crystalline composition according to the embodiment of the present invention to have a desired alignment state on the alignment film.

The alignment film can be provided by unit of a rubbing treatment on the film surface with an organic compound (preferably a polymer), oblique vapor deposition of an inorganic compound, forming a layer having microgrooves, or accumulation of an organic compound (for example, w-tricosanoic acid, dioctadecylmethylammonium chloride or methyl stearate) by the Langmure-Blogette method (LB film). Furthermore, there have been known alignment films having an aligning function imparted thereto by applying an electrical field, applying a magnetic field, or light irradiation. In the present invention, among these, an alignment film formed by a rubbing treatment is preferable in view of easy control of a pretilt angle of the alignment film, and a photo-alignment film formed by light irradiation is also preferable in view of alignment uniformity.

<Rubbed Alignment Film>

The polymer material used for an alignment film formed by a rubbing treatment is described in many literatures, and many commercially available products are available. In the present invention, polyvinyl alcohol or polyimide, or derivatives thereof can be preferably used. Regarding the alignment film, the description in the 24th line on page 43 to 8th line on page 49 in WO2001/088574A1 can be referred to. The thickness of the alignment film is preferably 0.01 to 10 μm, and more preferably 0.01 to 1 μm.

<Photo-Alignment Film>

The photo-alignment material used for an alignment film formed by light irradiation is described in many literatures. In the present invention, preferable examples thereof include azo compounds described in JP2006-0285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadimide compounds having photo-alignment units described in JP2002-265541A and JP2002-317013A, photocrosslinkable silane derivatives described in JP4205195B and JP4205198B, and photocrosslinkable polyimides, polyamides, and esters described in JP2003-520878A, JP2004-529220A, and JP4162850B. Azo compounds, photocrosslinkable polyimides, polyamides, and esters are more referable.

To a photo-alignment film formed from the above-described material, linearly polarized light or unpolarized light is applied to manufacture a photo-alignment film. In this specification, the "linearly polarized light irradiation" and the "unpolarized light irradiation" are operations for causing a photoreaction to the photo-alignment material. The wavelength of the light used varies depending on the photo-alignment material used and is not particularly limited as long as the wavelength is a wavelength necessary for the photoreaction. The peak wavelength of the light used for light irradiation is preferably 200 nm to 700 nm, and ultraviolet light having a light peak wavelength of 400 nm or less is more preferable.

The light source used for light irradiation is a usually used light source, and examples thereof include lamps such as a tungsten lamp, a halogen lamp, a xenon lamp, a xenon flash lamp, a mercury lamp, a mercury/xenon lamp, and a carbon arc lamp, various lasers [for example, a semiconductor laser, a helium/neon laser, an argon ion laser, a helium/cadmium laser, and an YAG (yttrium/aluminum/garnet) laser], light emitting diodes, and cathode ray tubes.

As unit for obtaining linearly polarized light, a method using a polarizing plate (for example, an iodine polarizing plate, a dichroic dye polarizing plate, or a wire grid polarizing plate), a method using a prism-based element (for example, a GLAN-THOMSON prism) or a reflective polarizer using a BREWSTER angle, or a method using light emitted from a polarized laser light source can be employed. Only light having a necessary wavelength may be selectively applied by using a filter, a wavelength conversion element, or the like.

In a case where linearly polarized light is used as light for irradiation, a method of irradiating the alignment film with light from an upper surface or a rear surface in a direction vertical or oblique to the alignment film surface is employed. Although the incidence angle of the light varies depending on the photo-alignment material, the incidence angle is preferably 0° to 90° (vertical), and more preferably 40° to 90°.

In a case where unpolarized light is used, the alignment film is irradiated with unpolarized light from an oblique direction. The incidence angle of the light is preferably 10° to 80°, more preferably 20° to 60°, and even more preferably 30° to 50°.

The irradiation time is preferably 1 minute to 60 minutes, and more preferably 1 minute to 10 minutes.

In a case where patterning is required, a method of performing light irradiation using a photomask as many times as necessary for pattern formation, or a pattern writing method using laser light scanning can be employed.

[Usage]

The laminate according to the embodiment of the present invention can be used as a polarizing element (polarizing plate). For example, it can be used as a linearly polarizing plate or a circularly polarizing plate.

In a case where the laminate according to the embodiment of the present invention has no optically anisotropic layer such as the λ/4 plate, the laminate can be used as a linearly polarizing plate.

In a case where the laminate according to the embodiment of the present invention has the λ/4 plate, the laminate can be used as a circularly polarizing plate.

[Image Display Device]

An image display device according to the embodiment of the present invention has the above-described light absorption anisotropic film or the above-described laminate.

The display element used for the image display device according to the embodiment of the present invention is not particularly limited, and examples thereof include a liquid crystal cell, an organic electroluminescence (hereinafter, abbreviated as "EL"), a display panel, and a plasma display panel.

Among these, a liquid crystal cell or an organic EL display panel is preferable, and a liquid crystal cell is more preferable. That is, as the image display device according to the embodiment of the present invention, a liquid crystal display device using a liquid crystal cell as a display element, or an organic EL display device using an organic EL display panel as a display element is preferable, and a liquid crystal display device is more preferable.

[Liquid Crystal Display Device]

A liquid crystal display device as an example of the image display device according to the embodiment of the present invention preferably has an aspect in which it has the above-described light absorption anisotropic film and a liquid crystal cell. More preferably, the liquid crystal display device has the above-described laminate (but including no λ/4 plate) and a liquid crystal cell.

In the present invention, it is preferable that the light absorption anisotropic film (laminate) according to the embodiment of the present invention be used as a polarizing element on the front side among light absorption anisotropic films (laminates) to be provided on both sides of a liquid crystal cell, and it is more preferable that the light absorption anisotropic film (laminate) according to the embodiment of the present invention be used as polarizing elements on the front side and the rear side.

Hereinafter, the liquid crystal cell of the liquid crystal display device will be described in detail.

<Liquid Crystal Cell>

The liquid crystal cell used for the liquid crystal display device is preferably a vertical alignment (VA) mode, an optically compensated bend (OCB) mode, an in-plane-switching (IPS) mode, or a twisted nematic (TN) mode, but is not limited thereto.

In a TN mode liquid crystal cell, with no application of a voltage, rod-like liquid crystalline molecules are substantially horizontally aligned, and twist-aligned by 60° to 120°. The TN mode liquid crystal cell is most frequently used as a color thin film transistor (TFT) liquid crystal display device, and is described in many literatures.

In a VA mode liquid crystal cell, rod-like liquid crystalline molecules are substantially vertically aligned with no application of a voltage. The VA mode liquid crystal cell includes (1) a narrowly-defined VA mode liquid crystal cell in which rod-like liquid crystalline molecules are substantially vertically aligned with no application of a voltage, and are substantially horizontally aligned with the application of a voltage (described in JP1990-176625A (JP-H2-176625A)), (2) a (MVA mode) liquid crystal cell in which the VA mode is made into multi-domains in order to expand the viewing angle (described in SID97, Digest of tech. Papers (proceedings) 28 (1997) 845), (3) an (n-ASM mode) liquid crystal cell in which rod-like liquid crystalline molecules are substantially vertically aligned with no application of a voltage, and are twisted in multi-domains with the application of a voltage (described in the proceedings 58 and 59 of Japanese Liquid Crystal Conference (1998)), and (4) a SURVIVAL mode liquid crystal cell (announced at LCD internal 98). In addition, the VA mode liquid crystal cell may be any one of a patterned vertical alignment (PVA) type, an optical alignment type, or a polymer-sustained alignment (PSA) type. Details of these modes are described in JP2006-215326A and JP2008-538819A.

In an IPS mode liquid crystal cell, rod-like liquid crystalline molecules are substantially horizontally aligned with respect to a substrate, and the liquid crystal molecules respond in a planar manner with the application of an electric field parallel to a substrate surface. The IPS mode displays a black image in a state in which no electric field is applied thereto, and the absorption axes of a pair of upper and lower polarizing plates are perpendicular to each other. A method of improving the viewing angle by reducing light leakage caused when a black image is displayed in an oblique direction using an optical compensation sheet is disclosed by JP1998-054982A (JP-H10-054982A), JP1999-202323A (JP-H11-202323A), JP1997-292522A (JP-H9-292522A), JP1999-133408A (JP-H11-133408A), JP1999-305217A (JP-H11-305217A), JP1998-307291A (JP-H10-307291A), and the like.

[Organic EL Display Device]

An organic EL display device as an example of the image display device according to the embodiment of the present invention preferably has an aspect in which it has a light absorption anisotropic film, a λ/4 plate, and an organic EL display panel in this order from the visual recognition side.

More preferably, the organic EL display device has the above-described laminate having a λ/4 plate and an organic EL display panel in this order from the visual recognition side. In this case, the laminate has a base, an alignment film to be provided as necessary, a light absorption anisotropic film, a barrier layer to be provided as necessary, and a λ/4 plate disposed in this order from the visual recognition side.

In addition, the organic EL display panel is a display panel configured using an organic EL element in which an organic light emitting layer (organic electroluminescence layer) is interposed between electrodes (between a cathode and an anode). The configuration of the organic EL display panel is not particularly limited, and a known configuration is employed.

EXAMPLES

Hereinafter, the present invention will be more specifically described based on examples. Materials, used amounts, ratios, treatment contents, treatment procedures, and the like shown in the following examples are able to be properly changed without departing from the gist of the present invention. Therefore, the scope of the present invention will not be restrictively interpreted by the following examples.

[Synthesis of Polymer Liquid Crystalline Compound]

A polymer liquid crystalline compound was produced according to the following procedures.

Synthesis Example 1

Synthesis of Polymer Liquid Crystalline Compound Used in Comparative Example 1

A polymer liquid crystalline compound (hereinafter, also referred to as "compound P1") used in Comparative Example 1 was produced according to the following procedures.

(Synthesis of Compound P1-1)

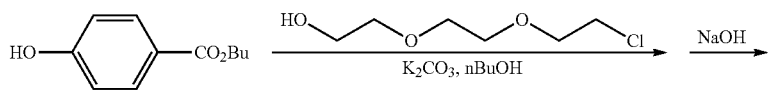

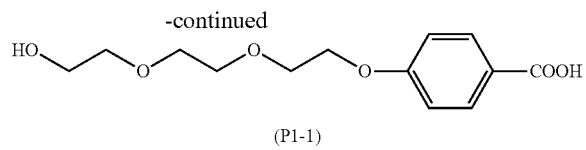

(P1-1)

Butylparaben (300 g) and potassium carbonate (299 g) were added to a normal butanol solution (480 mL) of 2-chloroethoxyethoxyethanol (365 g). After stirring for 18 hours at 100° C., water (1,050 mL) was added to wash off the reaction liquid by liquid separation. A 22 wt % sodium hydroxide aqueous solution (420 g) was added to the obtained organic layer, and stirring was performed for 3 hours at 50° C. Then, the temperature was returned to room temperature, a concentrated hydrochloric acid was added dropwise until the pH reached 3, and the reaction liquid was washed off by liquid separation. A mixed solution of isopropyl alcohol (540 mL) and normal hexane (1,260 mL) cooled to 10° C. or lower was added dropwise to the obtained organic layer, and filtering was performed to obtain 361 g of a white solid compound (P1-1) (2-step yield: 87%).

$^1$H-NMR (Nuclear Magnetic Resonance) (solvent: DMSO-d6) δ (ppm): 3.38-3.64 (m, 8H), 3.73-3.79 (m, 2H), 4.13-4.19 (m, 2H), 4.58 (brs, 1H), 6.98-7.05 (m, 2H), 7.85-7.90 (m, 2H), 12.63 (brs, 1H)

DMSO means dimethyl sulfoxide. In the formula, Bu means a butyl group.

(Synthesis of P1-2)

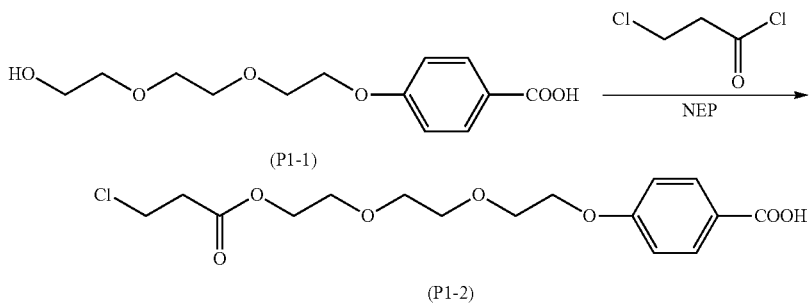

300 g of the white solid compound (P1-1) was dissolved in N-ethylpyrrolidone (450 mL) (abbreviated as NEP in the formula) and ethyl acetate (800 mL), and the internal temperature was reduced to 5° C. Thereto, 3-chloropropionic acid chloride (169 g) was added dropwise such that the internal temperature did not rise above 15° C. After stirring for 3 hours at 10° C., 10 mass % saline (1,200 mL) was added, and liquid separation was performed at room temperature. 10 mass % saline (1,200 mL) was added again to the obtained organic layer, and liquid separation was performed. Thereafter, methanol (750 mL) and water (750 mL) were added dropwise to the organic layer under stirring, and the mixture was cooled to 15° C. Then, water (300 mL) was added dropwise again. Next, 332 g (yield: 83%) of a white solid compound (P1-2) was obtained by filtering.

$^1$H-NMR $^1$H-NMR (solvent: CDCl$_3$) δ (ppm): 2.82 (t, 2H), 3.65-3.83 (m, 8H), 3.85-3.95 (m, 2H), 4.15-4.25 (m, 2H), 4.25-4.35 (m, 2H), 6.93-7.00 (m, 2H), 8.02-8.08 (m, 2H)

<Synthesis of P1-3>

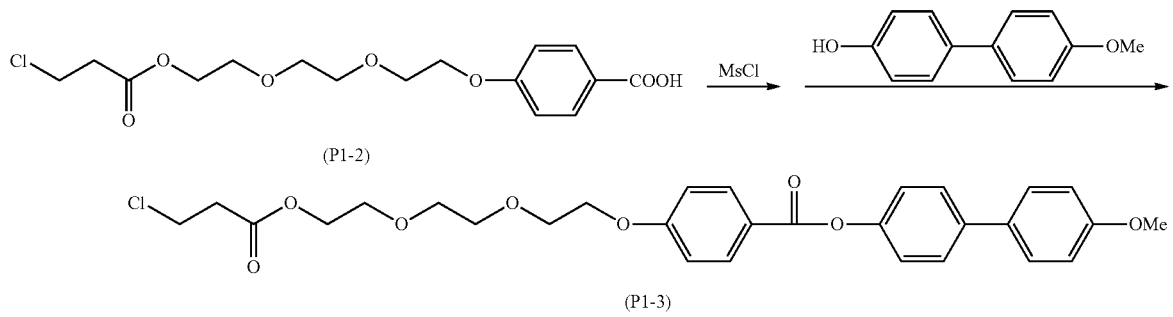

An ethyl acetate solution (253 mL) of methanesulfonyl chloride (56 g) (abbreviated as MsCl in the formula) was cooled to an internal temperature of 0° C. Thereto, the compound (P1-2) (168 g), diisopropylethylamine (DIPEA) (63 g), and an ethyl acetate solution (253 mL) of dibutyl-hydroxytoluene (BHT) (930 mg) were added dropwise such that the internal temperature did not rise above 10° C. After stirring for 1 hour at 5° C., 4-hydroxy-4'-methoxybiphenyl (85 g) and N-methylimidazole (17 g) were added, and diisopropylethylamine (55 g) was added dropwise such that the internal temperature did not rise above 10° C. Then, stirring was performed for 4 hours at room temperature. An aqueous solution obtained by mixing 34 g of sodium chloride and a 0.5 N hydrochloric acid solution (660 mL) was added to the reaction liquid to stop the reaction, and liquid separation was performed. Acetonitrile (168 mL) and methanol (842 mL) were added to the extracted organic layer under stirring, and water (337 mL) was added dropwise. Thereafter, the mixture was cooled to 0° C., and filtering was performed to obtain 219 g of a compound (P1-3) as a white solid (yield: 95%).

$^1$H-NMR (solvent: CDCl$_3$) δ (ppm): 2.83 (t, 2H), 3.65-3.80 (m, 8H), 3.86 (s, 3H), 3.87-3.95 (m, 2H), 4.18-4.26 (m, 2H), 4.27-4.35 (m, 2H), 6.95-7.05 (m, 4H), 7.22-7.28 (m, 2H), 7.48-7.62 (m, 4H), 8.14-8.18 (m, 2H)

In the formula, Mc means a methyl group, and the same also applies to each formula to be described later.

(Synthesis of P1-4>)

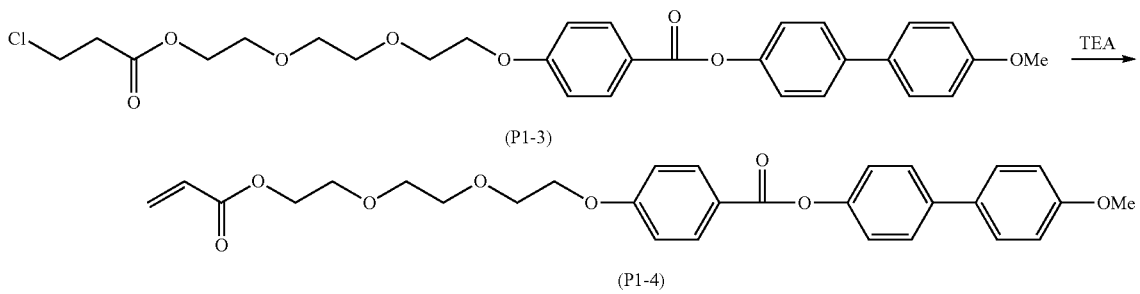

The compound (P1-3) (160 g) and dibutylhydroxytoluene (BHT) (1,300 mg) were dissolved in a mixed solution of ethyl acetate (180 mL), toluene (176 mL), and acetonitrile (208 mL), and then triethylamine (60 g) (abbreviated as TEA in the formula) was added dropwise. Stirring was performed for 3 hours at 60° C. After cooling to room temperature, a 1N hydrochloric acid solution (288 mL) was added to the reaction liquid to stop the reaction, and liquid separation was performed. After filtering the extracted organic layer with a filter, methanol (960 mL) was added dropwise under stirring. Thereafter, the mixture was cooled to 0° C., and filtering was performed to obtain 138 g of a compound (P1-4) as a white solid (yield: 93%). The compound purity was 98%.

$^1$H-NMR (solvent: CDCl$_3$) δ (ppm): 3.68-3.80 (m, 6H), 3.85 (s, 3H), 3.87-3.94 (m, 2H), 4.18-4.26 (m, 2H), 4.32-4.38 (m, 2H), 5.83 (dd, 1H), 6.16 (dd, 1H), 6.43 (dd, 1H), 6.95-7.05 (m, 4H), 7.22-7.28 (m, 2H), 7.48-7.62 (m, 4H), 8.13-8.20 (m, 2H)

The following compound (P1-b) is included as impurities. In Formula (P1-b), n means an integer except for 3.

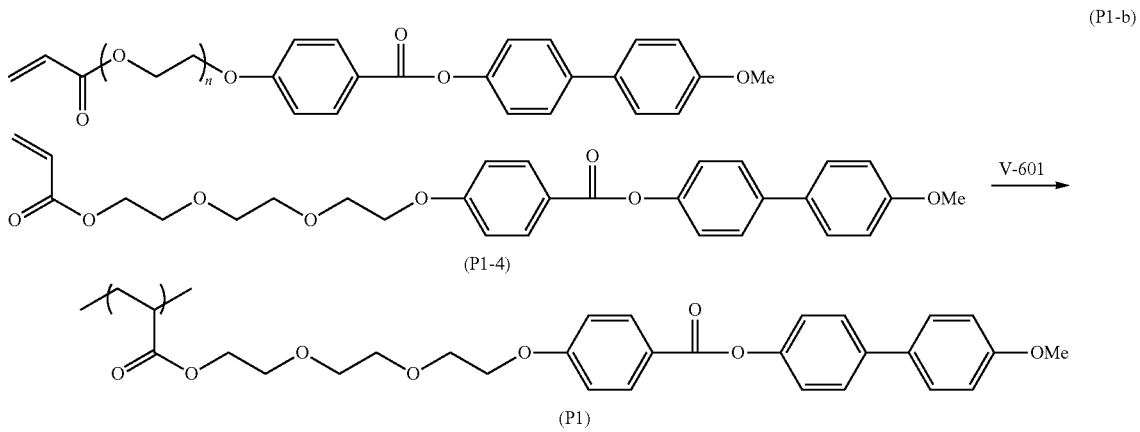

A dimethylacetamide (DMAc) solution (83 mL) of the compound (P1-4) (25.0 g) was heated to an internal temperature of 80° C. A DMAc solution (10 mL) of 2,2'-azobis (2-methylpropionic acid)dimethyl (0.34 g) (trade name "V-601", manufactured by FUJIFILM Wako Pure Chemical Corporation) was added thereto under a nitrogen atmosphere, and stirring was performed for 2 hours at 80° C. Thereafter, disappearance of the polymerizable group was confirmed by $^1$H-NMR spectrum measurement, and the solution was cooled to room temperature. The reaction liquid was added dropwise to 2,000 mL of methanol, the precipitated solid was collected by filtering, and the residues were washed with methanol to obtain 23 g of a compound P1 as a white solid (a polymer liquid crystalline compound used in Comparative Example 1). A weight-average molecular weight (Mw) of the obtained polymer was 14,500.

The molecular weight was calculated by gel permeation chromatography (GPC) in terms of polystyrene. The column used was TOSOH TSKgelSuper AWM-H (6 mm×15 cm), and three columns were connected. N-methylpyrrolidone was used as a solvent.

Synthesis Example 2

Synthesis of Polymer Liquid Crystalline Compound Used in Example 3

According to the following steps 1 and 2, a polymer liquid crystalline compound used in Example 3 (hereinafter, also referred to as "compound P2") was synthesized.

<Step 1>

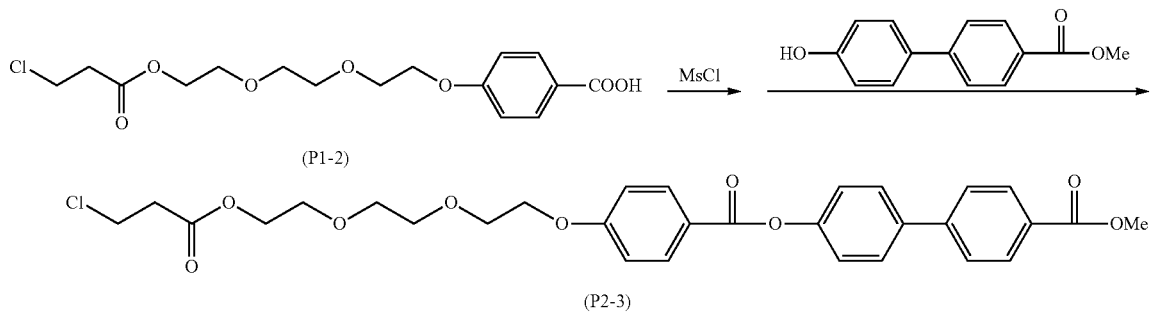

Methyl 4-(4-hydroxyphenyl)benzoate was synthesized by the method described in Journal of Polymer Science, Part A: Polymer Chemistry, 2012, vol. 50, p. 3936 to 3943.

A toluene solution (300 mL) of methanesulfonyl chloride (66 g) was cooled to an internal temperature of 0° C. Thereto, the compound (P1-2) (200 g), diisopropylethylamine (DIPEA) (75 g), and a tetrahydrofuran solution (400 mL) of dibutylhydroxytoluene (BHT) (2.2 g) were added dropwise such that the internal temperature did not rise above 10° C. After stirring for 1 hour at 5° C., methyl 4-(4-hydroxyphenyl)benzoate (115 g), acetonitrile (200 mL), and N-methylimidazole (21 g) were added, and diisopropylethylamine (65 g) was added dropwise such that the internal temperature did not increase to 10° C. or higher. Then, stirring was performed for 4 hours at room temperature. An aqueous solution obtained by mixing 40 g of sodium chloride and a 0.5 N hydrochloric acid solution (800 mL) was added to the reaction liquid to stop the reaction, and liquid separation was performed. Methanol (1,400 mL) was added dropwise to the extracted organic layer under stirring. Thereafter, the mixture was cooled to 0° C., and filtering was performed to obtain 258 g of a compound (P2-3) as a white solid (yield: 90%).

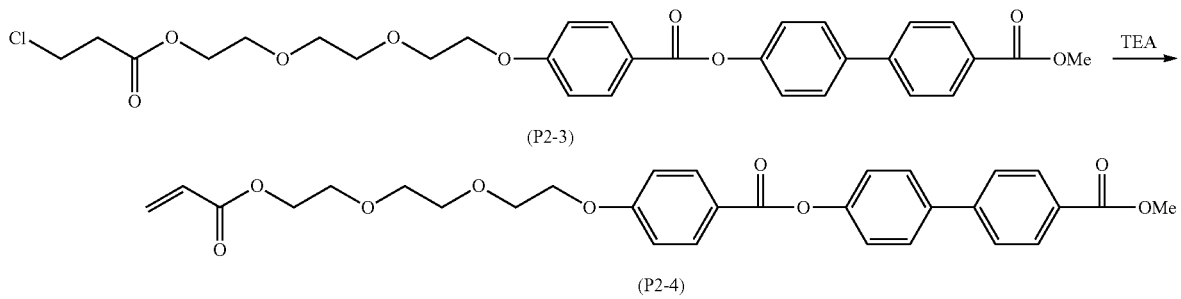

The compound (P2-3) (50 g) and dibutylhydroxytoluene (BHT) (390 mg) were dissolved in a mixed solution of ethyl acetate (75 mL), toluene (50 mL), and acetonitrile (50 mL), and then triethylamine (18 g) was added dropwise. Stirring was performed for 3 hours at 60° C. After cooling to room temperature, a 1N hydrochloric acid solution (88 mL) was added to the reaction liquid to stop the reaction, and liquid separation was performed. After filtering the extracted organic layer with a filter, methanol (300 mL) was added dropwise under stirring. Thereafter, the mixture was cooled to 0° C., and filtering was performed to obtain 41 g of a compound (P2-4) as a white solid (yield: 93%). The compound purity was 98%.

$^1$H-NMR (solvent: CDCl$_3$) δ (ppm): 3.68-3.80 (m, 6H), 3.87-3.95 (m, 2H), 3.95 (s, 3H), 4.20-4.27 (m, 2H), 4.31-4.37 (m, 2H), 5.83 (dd, 1H), 6.16 (dd, 1H), 6.43 (dd, 1H), 6.97-7.05 (m, 2H), 7.28-7.35 (m, 2H), 7.64-7.72 (m, 4H), 8.08-8.20 (m, 4H)

The following compound (P2-b) is included as impurities. In Formula (P2-b), n means an integer except for 3.

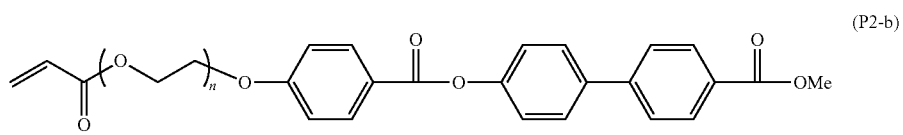

(P2-b)

<Step 2>

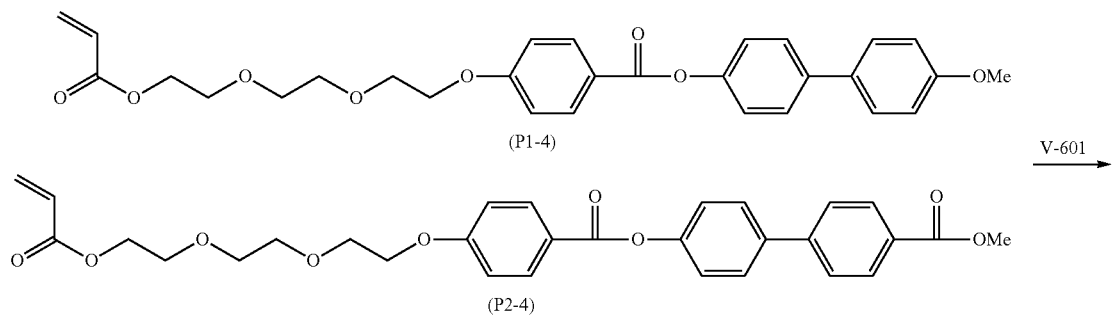

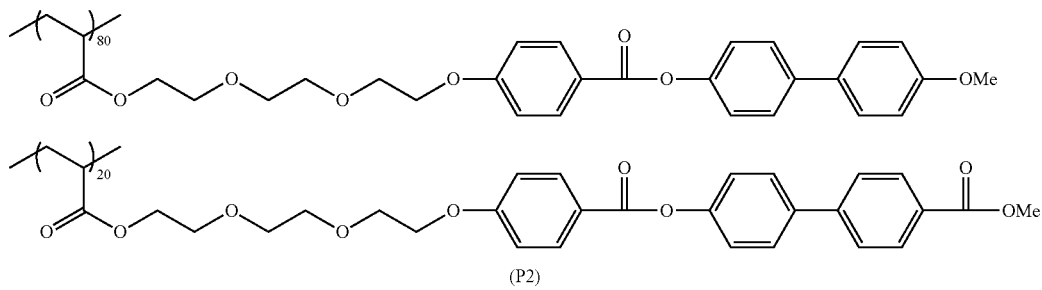

The compound (P1-4) (84 g), the compound (P2-4) (21 g), a DMAc solution (347 mL) of dibutylhydroxytoluene (BHT) (158 mg) were heated to an internal temperature of 80° C. A DMAc solution (40 mL) of 2,2'-azobis(2-methylpropionic acid)dimethyl (1,660 g) (trade name "V-601") was added thereto under a nitrogen atmosphere, and stirring was performed for 4 hours at 80° C. The obtained reaction liquid was added dropwise to methanol (10 L), and the precipitate was collected by filtering. Then, the residues were washed using acetonitrile to obtain 98 g of a compound P2 (a polymer liquid crystalline compound used in Example 3) as white solid (yield: 93%). A weight-average molecular weight (Mw) of the obtained polymer was 1,600.

The molecular weight was calculated by gel permeation chromatography (GPC) in terms of polystyrene. The column used was TOSOH TSKgelSuper AWM-H (6 mm×15 cm), and three columns were connected. N-methylpyrrolidone was used as a solvent.

In the formula, the numerical value given to the repeating unit means a mass ratio (mass %).

Synthesis Example 3

Synthesis of Polymer Liquid Crystalline Compound Used in Example 13

According to the following steps 1 to 3, a polymer liquid crystalline compound used in Example 13 (hereinafter, also referred to as "compound P3") was synthesized.

(Step (1)

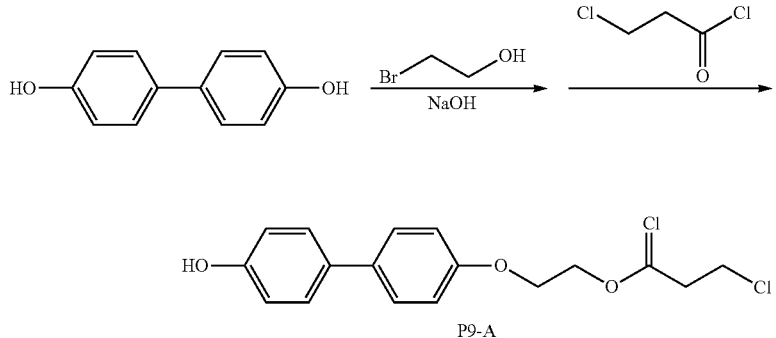

Sodium hydroxide (34.2 g) was dissolved in 1 L of water, and 4,4'-dihydroxybiphenyl (40.6 g) and bromoethanol (37.2 g) were added under a nitrogen atmosphere. The mixture was stirred for 10 hours at 95° C.

Then, the reaction system was cooled to room temperature and adjusted to be acidic by adding a concentrated hydrochloric acid. After that, filtering and drying were performed to obtain a white solid containing a compound P9-A.

The obtained white solid was dissolved in 400 mL of dimethylacetamide (DMAc), and 3-chloropropionyl chloride (62.0 g) was added dropwise under ice cooling. Stirring was performed for 5 hours. The reaction was stopped by adding methanol (40 mL), and then water and ethyl acetate were added.

The solvent was removed from the organic layer washed by a liquid separation by a rotary evaporator, and chloroform was added to the obtained concentrate. After the precipitated solid was removed by filtering, the solvent was removed by a rotary evaporator, and purification was performed by column chromatography using ethyl acetate/chloroform to obtain 20.3 g of a compound P9-A as a white solid (yield: 29%).

$^1$H-NMR (solvent: DMSO-$d_6$) δ (ppm): 2.80-2.90 (t, 2H), 3.75-3.85 (t, 2H), 4.15-4.25 (m, 2H), 4.35-4.45 (m, 2H), 6.75-6.85 (m, 2H), 6.90-7.00 (m, 2H), 7.30-7.50 (m, 4H), 9.40 (brs, 1H)

(Step 2)

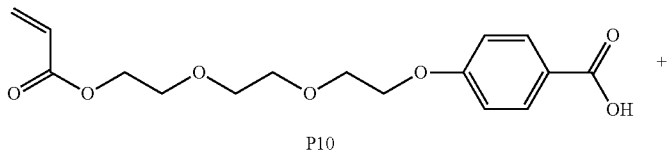

P10

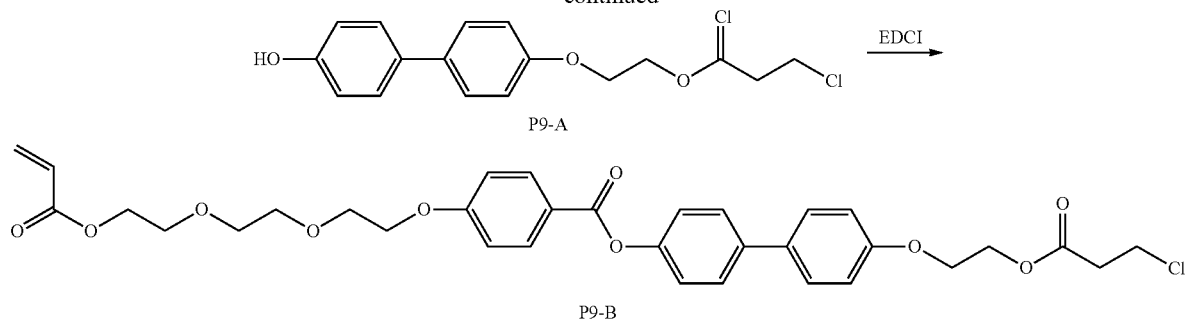

4.0 g of the compound P9-A, 8.08 g of the compound P10, and 100 mL of dichloromethane were mixed and stirred at room temperature. To the mixture, 152 mg of N,N-dimethylaminopyridine and 9.56 g of 1-(3-dimethylaminopropyl)-3-ethylcarbodiimide hydrochloride (EDCI) were added and stirred for 12 hours at room temperature.

Thereafter, the solvent was removed by a rotary evaporator, and filtering was performed by adding 120 mL of methanol and 120 mL of a 1 M hydrochloric acid solution to obtain a white solid. Liquid separation was performed by adding ethyl acetate and water to the obtained white solid, and the collected organic layer was washed with a 1 N hydrochloric acid solution and saturated saline. Then, drying was performed with anhydrous sodium sulfate. The sodium sulfate was filtered off to remove the solvent by a rotary evaporator, and purification by silica gel chromatography was performed to obtain 5.4 g of a compound P9-B (yield: 69%).

$^1$H-NMR (solvent: CDCl$_3$) δ (ppm): 2.87 (t, 2H), 3.68-3.82 (m, 8H), 3.90 (t, 2H), 4.18-4.28 (m, 4H), 4.28-4.38 (m, 2H), 4.46-4.54 (m, 2H), 5.84 (dd, 1H), 6.16 (dd, 1H), 6.43 (dd, 1H), 6.90-7.05 (m, 4H), 7.20-7.30 (m, 2H), 7.48-7.65 (m, 4H), 8.10-8.20 (m, 2H)

(Step 3)

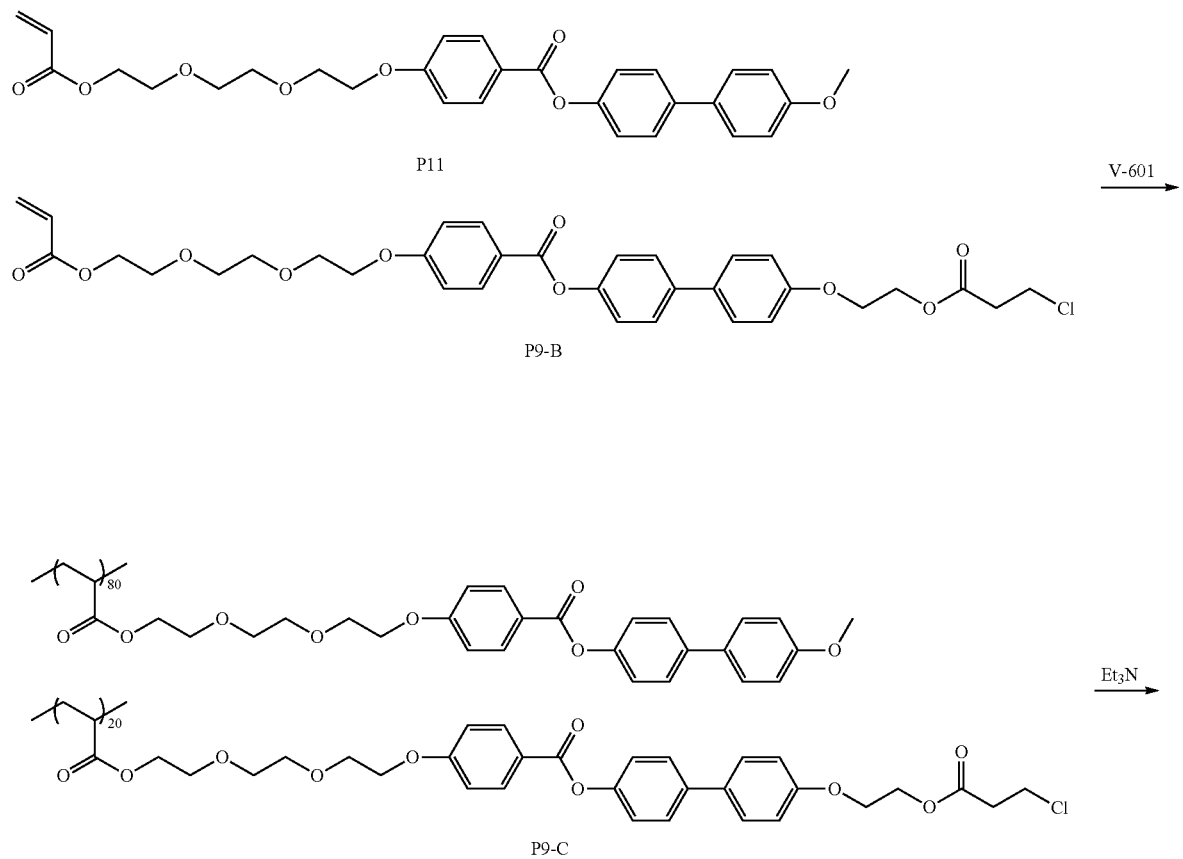

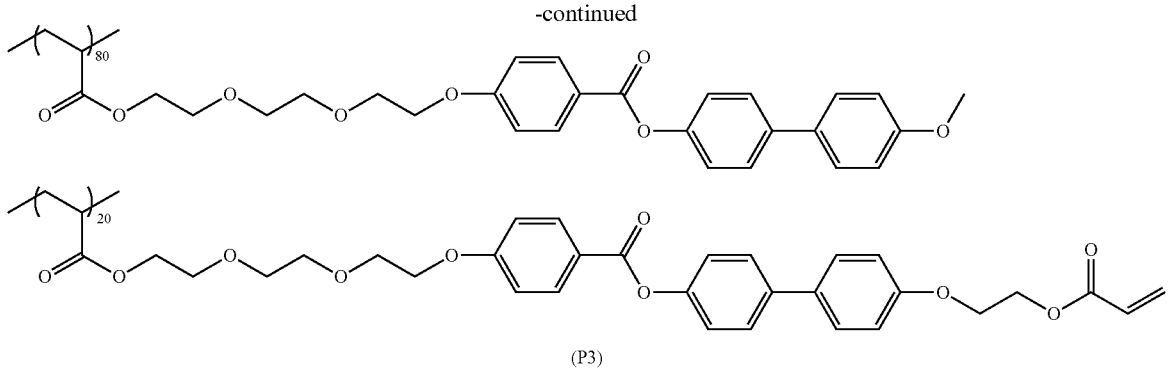

(P3)

A DMAc solution (3.3 mL) of the compound P11 (0.8 g) and the compound P9-B (0.2 g) was heated to an internal temperature of 80° C. under a nitrogen stream. A DMAc solution (0.5 mL) of 2,2'-azobis(2-methylpropionic acid) dimethyl (0.054 mmol, 0.012 g) was added thereto, and stirring was performed for 2 hours at 80° C. Thereafter, disappearance of the polymerizable group was confirmed by $^1$H-NMR spectrum measurement, and the solution was cooled to room temperature. Methanol was added for filtering, and the residues were washed with methanol to obtain 0.90 g of a compound P9-C as a white solid. Dibutylhydroxytoluene (BHT) (50 mg) and triethylamine (0.7 mL) were added to a chloroform solution (7 mL) of the obtained compound P9-C and heated to an internal temperature of 50° C. After stirring for 9 hours at 50° C., disappearance of the raw material was confirmed by $^1$H-NMR spectrum measurement, and the solution was cooled to room temperature. Methanol was added thereto for filtering, and the residues were washed with methanol to obtain 0.8 g of a compound P3 as a white solid (a polymer liquid crystalline compound used in Example 13). In a case where the obtained compound P3 was analyzed by gel permeation chromatography (GPC), a weight-average molecular weight (Mw) thereof was 17,000 (in terms of polystyrene).

<Polymer Liquid Crystalline Compounds Other than Those Described Above, Used in Examples and Comparative Examples>

Polymer liquid crystalline compounds other than those described above, used in the examples and the comparative examples, were synthesized using the above-described synthesis examples or known methods.

Example 1

[Production of Alignment Film]

A glass base (manufactured by Central Glass Co., Ltd., blue plate glass, size: 300 mm'300 mm, thickness: 1.1 mm) was washed with an alkaline detergent, and then pure water was poured thereto. After that, the glass base was dried.

The following alignment film forming composition 1 was applied to the glass base after the drying using a bar #12, and the applied alignment film forming composition 1 was dried for 2 minutes at 110° C. to form a coating film on the glass base.

The obtained coating film was subjected to a rubbing treatment (rotation speed of roller: 1,000 rotations/2.9 mm of spacer thickness, stage speed: 1.8 m/min) once to produce an alignment film 1 on the glass base.

| Composition of Alignment Film Forming Composition 1 | |
|---|---|
| Modified Vinyl Alcohol (see Formula (PVA-1)) | 2.00 parts by mass |
| Water | 74.08 parts by mass |
| Methanol | 23.86 parts by mass |
| Photopolymerization Initiator (IRGACURE 2959, manufactured by BASF SE) | 0.06 parts by mass |

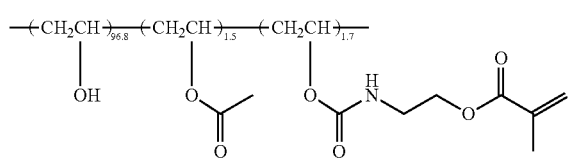

(PVA-1)

In Formula (PVA-1), the numerical value in the repeating unit represents mol % of each repeating unit with respect to all the repeating units in the modified vinyl alcohol.

[Production of Light Absorption Anisotropic Film]

The obtained alignment film 1 was spin-coated with the following liquid crystalline composition 1 by 1,000 rotations to form a coating film.

The coating film was dried at room temperature for 30 seconds, and then heated at 150° C. for 60 seconds.

Next, the coating film was cooled to room temperature, and then irradiated with light under an irradiation condition of an illuminance of 28 mW/cm$^2$ at 80° C. using a high-pressure mercury lamp for 60 seconds to produce a light absorption anisotropic film 1 on the alignment film 1.

| Composition of Liquid Crystalline Composition 1 (Content of Dichroic Substance in Total Solid Content: 13 mass %) | |
|---|---|
| Polymer Liquid Crystalline Compound Described in Example 1 of Table 1 | 7.20 parts by mass |
| Following Dichroic Substance D1 | 0.48 parts by mass |
| Following Dichroic Substance D2 | 0.62 parts by mass |
| Polymerization Initiator Irg-819 (manufactured by BASF SE) | 0.02 parts by mass |
| Following Interface Improver F1 | 0.01 parts by mass |
| Trichloromethane | 91.96 parts by mass |

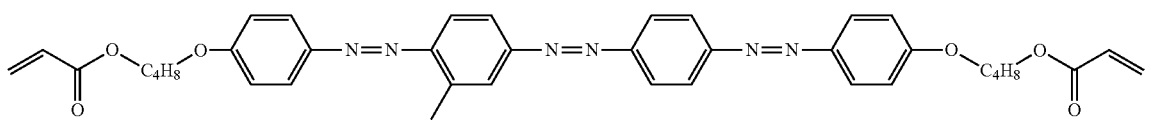

D1

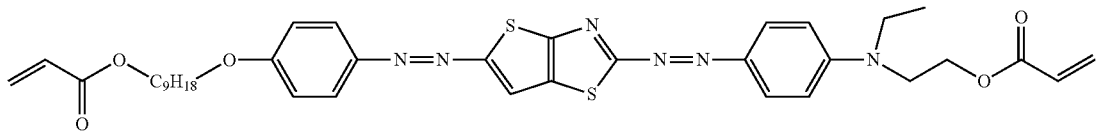

D2

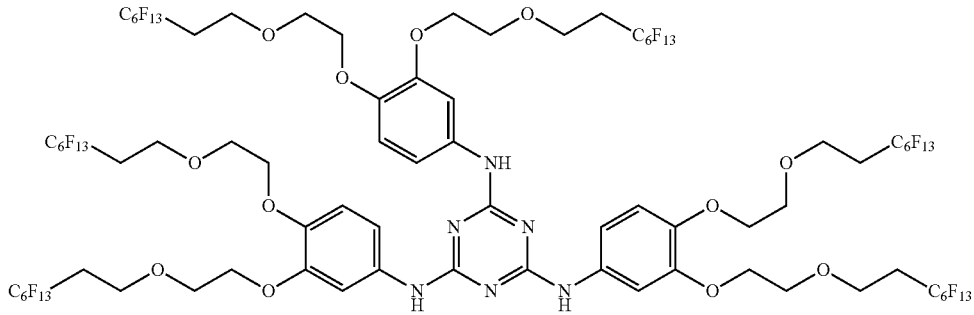

F1

Examples 2 to 19 and Comparative Examples 1 to 7

A light absorption anisotropic film was produced on the alignment film 1 in the same manner as in Example 1, except that the kind or content of the polymer liquid crystalline compound in the liquid crystalline composition was changed as shown in the following Table 1.

Structural formulae corresponding to the kinds of the repeating units 1 and 2 in Table 1 are collectively shown below.

In addition, Table 1 shows the Hammett's substituent constants σp of the groups surrounded by the dotted line in the following structural formulae (in Table 1, described as "σp Value of Terminal Group"). Regarding the following (B-7), the Hammett's substituent constant σp of the hydrogen atom (that is, the hydrogen atom of the phenyl group) at the terminal of the mesogenic group is shown. The Hammett's substituent constants σp of the repeating units B-5 B-6 are calculated using the above-described software, and as the Hammett's substituent constants σp of other repeating units, the values described in the above-described literature are shown.

Repeating Units 1

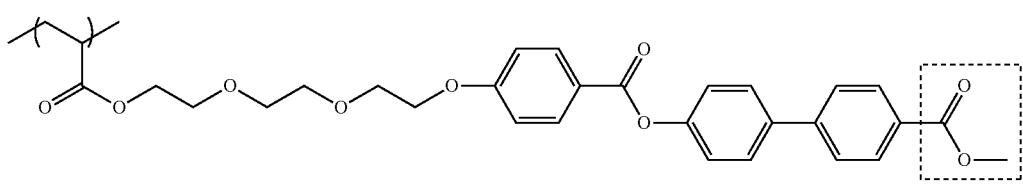

(B-1)

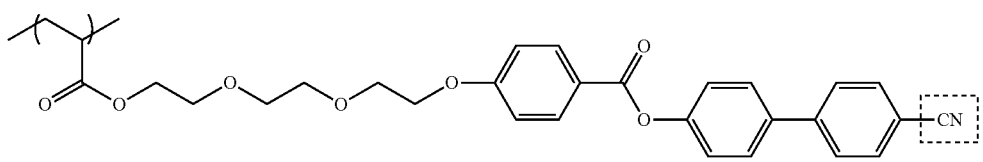

(B-2)

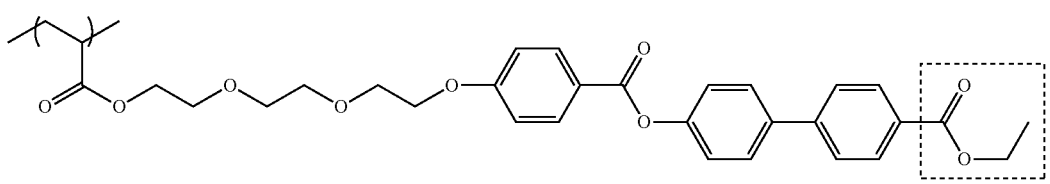

(B-3)

-continued
(B-4)
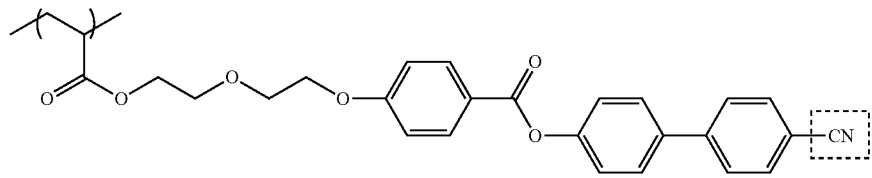
(B-5)
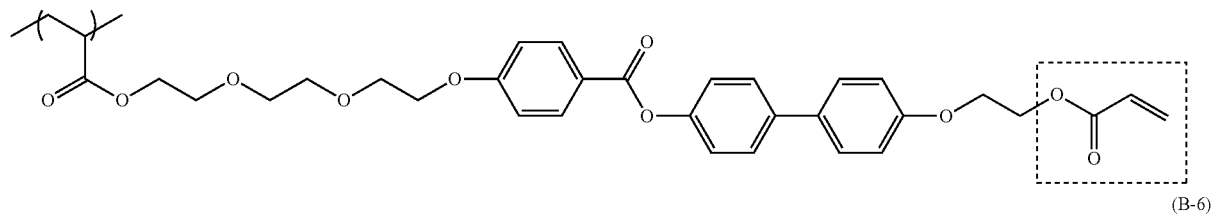
(B-6)
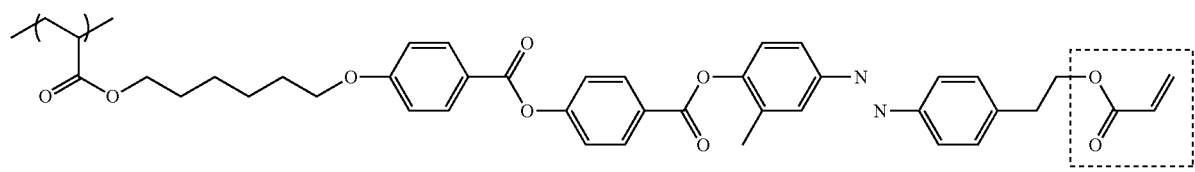
(B-7)
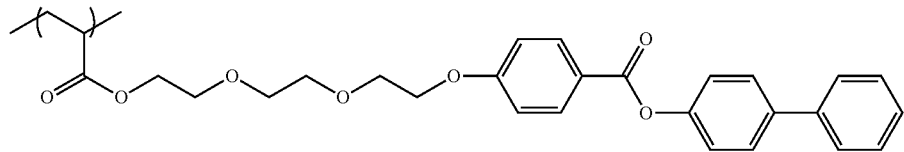
(B-8)
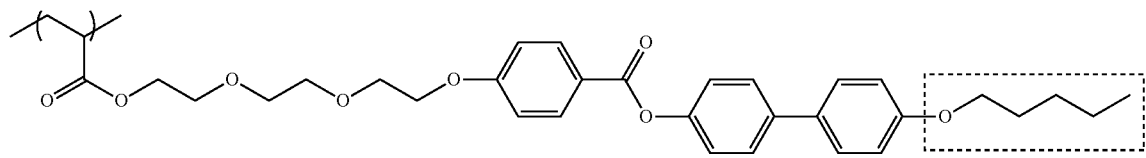
(B-9)
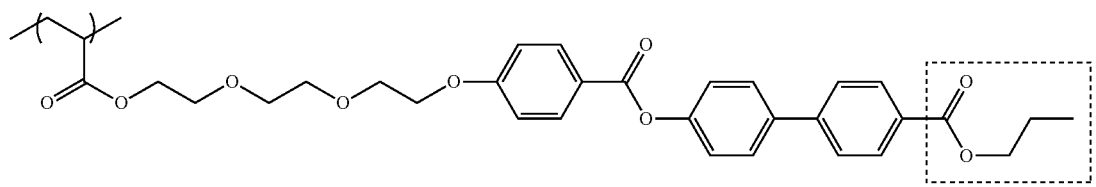
(B-10)
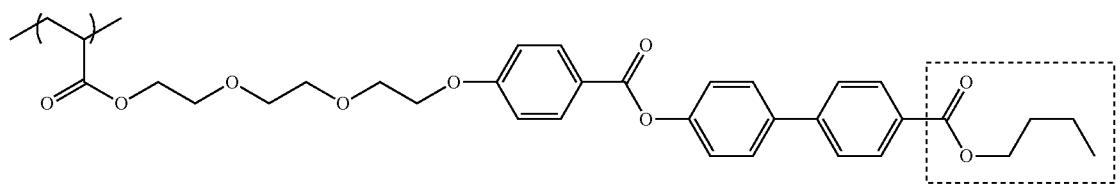

Repeating Units 2

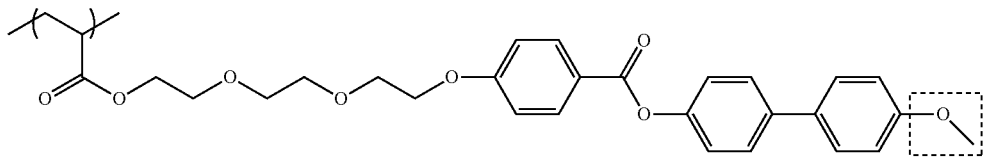
(A-1)

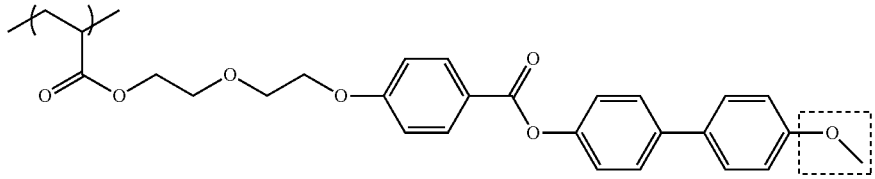
(A-2)

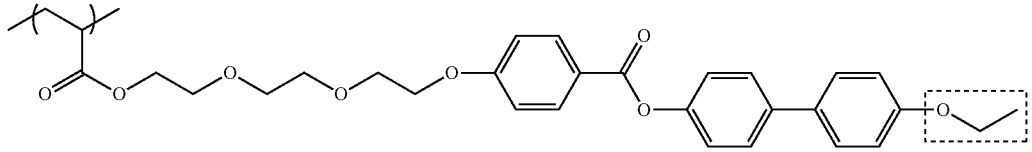
(A-3)

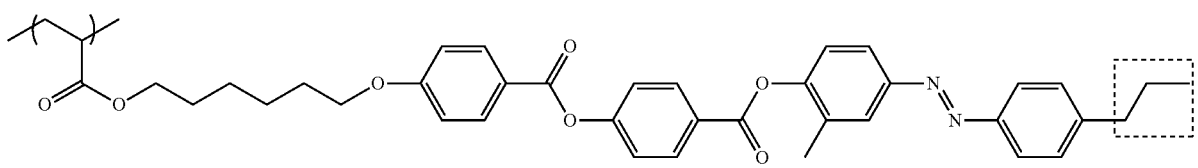
(A-4)

[Evaluation]
[Calculation of Alignment Degree]
In a state in which a linear polarizer was inserted on the light source side of an optical microscope (manufactured by Nikon Corporation, product name "ECLIPSE E600 POL"), the light absorption anisotropic film of each of the examples and the comparative examples was set on a sample table, and using a multi-channel spectroscope (manufactured by Ocean Optics, Inc., product name "QE65000"), an absorbance of the light absorption anisotropic film in a wavelength region described in Table 1 was measured to calculate an alignment degree by the following formula. The results are shown in the following Table 1.

Alignment Degree: $S=[(Az0/Ay0)-1]/[(Az0/Ay0)+2]$

Az0: absorbance of light absorption anisotropic film with respect to polarization in absorption axis direction
Ay0: absorbance of light absorption anisotropic film with respect to polarization in polarization axis direction
[Evaluation of Alignment Degree]
Regarding Examples 1 to 11, 13, 14, and 17 to 19, by the use of Comparative Example 1 using only the repeating unit 2 contained in the polymer liquid crystalline compound of Examples 1 to 11, 13, 14, and 17 to 19 as a reference sample, the alignment degree of each of the light absorption anisotropic films of Examples 1 to 11, 13, 14, and 17 to 19 was compared to the alignment degree of the light absorption anisotropic film of Comparative Example 1 as a reference sample to evaluate the alignment degree according to the following criteria.

Similarly, in order to evaluate the alignment degree, Comparative Example 2 was used as a reference sample in Example 12, Comparative Example 3 was used as a reference sample in Example 15, Comparative Example 7 was used as a reference sample in Example 16, and Comparative Example 1 was used as a reference sample in Comparative Examples 5 and 6.

Since Comparative Examples 1 to 3 and 7 were reference samples, these were expressed as "-", meaning that the evaluation was not possible, in the column of Evaluation of Alignment Degree in Table 1. In addition, since a polymer liquid crystalline compound having no repeating unit 2 was used, Comparative Example 4 was expressed as "-", meaning that the evaluation was not possible, in the column of Evaluation of Alignment Degree in Table 1.

A: The alignment degree is higher than that of the reference sample by 0.02 or greater.
B: The alignment degree is higher than that of the reference sample by 0.01 to less than 0.02.
C: The alignment degree is equal to or higher than that of the reference sample (by 0 or greater) by less than 0.01.
D: The alignment degree is lower than that of the reference sample.

TABLE 1

| | | Polymer Liquid Crystalline Compound | | | | | | Evaluation Results | |
|---|---|---|---|---|---|---|---|---|---|
| | | Repeating Unit 1 | | Repeating Unit 2 | | Copolymerization Ratio (mass %) | | (σp Value of Terminal Group of Repeating Unit 1) × (Content Ratio of Repeating Unit 1) | |
| | | Kind | σp Value of Terminal Group | Kind | σp Value of Terminal Group | Repeating Unit 1 | Repeating Unit 2 | Alignment Degree (400 to 700 nm) | Evaluation of Alignment Degree |
| Examples | 1 | B-1 | 0.45 | A-1 | −0.27 | 10 | 90 | 0.045 | 0.95 | B |
| | 2 | B-1 | 0.45 | A-1 | −0.27 | 15 | 85 | 0.068 | 0.96 | A |
| | 3 | B-1 | 0.45 | A-1 | −0.27 | 20 | 80 | 0.090 | 0.96 | A |
| | 4 | B-1 | 0.45 | A-1 | −0.27 | 25 | 75 | 0.113 | 0.96 | A |
| | 5 | B-1 | 0.45 | A-1 | −0.27 | 30 | 70 | 0.135 | 0.95 | B |
| | 6 | B-2 | 0.66 | A-1 | −0.27 | 5 | 95 | 0.033 | 0.95 | B |
| | 7 | B-2 | 0.66 | A-1 | −0.27 | 8 | 92 | 0.053 | 0.96 | A |
| | 8 | B-2 | 0.66 | A-1 | −0.27 | 10 | 90 | 0.066 | 0.96 | A |
| | 9 | B-2 | 0.66 | A-1 | −0.27 | 12 | 88 | 0.079 | 0.96 | A |
| | 10 | B-3 | 0.45 | A-1 | −0.27 | 20 | 80 | 0.090 | 0.96 | A |
| | 11 | B-3 | 0.45 | A-1 | −0.27 | 30 | 70 | 0.135 | 0.95 | B |
| | 12 | B-4 | 0.66 | A-2 | −0.27 | 5 | 95 | 0.033 | 0.95 | B |
| | 13 | B-5 | 0.20 | A-1 | −0.27 | 20 | 80 | 0.040 | 0.95 | B |
| | 14 | B-5 | 0.20 | A-1 | −0.27 | 27 | 73 | 0.054 | 0.95 | B |
| | 15 | B-4 | 0.66 | A-3 | −0.24 | 10 | 90 | 0.066 | 0.94 | B |
| | 16 | B-6 | 0.20 | A-4 | −0.13 | 10 | 90 | 0.020 | 0.85 | B |
| | 17 | B-9 | 0.45 | A-1 | −0.27 | 20 | 80 | 0.090 | 0.95 | B |
| | 18 | B-10 | 0.45 | A-1 | −0.27 | 20 | 80 | 0.090 | 0.95 | B |
| | 19 | B-4 | 0.66 | A-1 | −0.27 | 10 | 90 | 0.066 | 0.95 | B |
| Comparative Examples | 1 | — | — | A-1 | −0.27 | — | 100 | — | 0.94 | — |
| | 2 | — | — | A-2 | −0.27 | — | 100 | — | 0.94 | — |
| | 3 | — | — | A-3 | −0.24 | — | 100 | — | 0.93 | — |
| | 4 | B-6 | 0.20 | — | — | 100 | — | — | 0.84 | — |
| | 5 | B-7 | 0.00 | A-1 | −0.27 | 10 | 90 | 0.000 | 0.92 | D |
| | 6 | B-8 | −0.34 | A-1 | −0.27 | 20 | 80 | −0.068 | 0.92 | D |
| | 7 | — | — | A-4 | −0.13 | — | 100 | — | 0.84 | — |

As shown in Table 1, it has been found that in a case where a polymer liquid crystalline compound which has a repeating unit 1 having a mesogenic group and an electron-withdrawing group having a Hammett's substituent constant σp of greater than 0 at a terminal of the mesogenic group and a repeating unit 2 having a mesogenic group and a group having a Hammett's substituent constant σp of 0 or less at a terminal of the mesogenic group is blended (examples), the alignment degree of a light absorption anisotropic film to be formed using the polymer liquid crystalline compound is higher than that in a case where a polymer liquid crystalline compound which does not have the repeating unit 1 or 2 is used (comparative example).

From the comparison of Example 3 with Example 13, it has been found that in a case where a polymer liquid crystalline compound in which the terminal group of the repeating unit 1 has a σp value of 0.3 or greater and the terminal group of the repeating unit 2 has a σp value of −0.1 or less is used (Example 3), the alignment degree of a light absorption anisotropic film can be further increased.

From the comparison of Examples 1 to 5, it has been found that in a case where the product of the σp value of the terminal group of the repeating unit 1 and the content ratio (based on mass) of the repeating unit 1 in the liquid crystalline compound is within a range of 0.050 to 0.130 (Examples 2 to 4), the alignment degree of a light absorption anisotropic film can be further increased.

From the comparison of Example 8 with Example 19, it has been found that in a case where the repeating units 1 and 2 have a similar structure (Example 8), the alignment degree of a light absorption anisotropic film can be further increased.

What is claimed is:

1. A liquid crystalline composition comprising:
a side chain type polymer liquid crystalline compound; and
a dichroic substance,
wherein the side chain type polymer liquid crystalline compound is a copolymer having repeating units 1 and 2, the repeating unit 1 is a repeating unit represented by Formula (1), the repeating unit 2 does not correspond to the repeating unit represented by Formula (1), but is a repeating unit represented by Formula (2),
a content of the repeating unit 1 is 40 mass % or less with respect to a total mass of the side chain type polymer liquid crystalline compound,
a content of the repeating unit 2 is 60 mass % or greater with respect to the total mass of the side chain type polymer liquid crystalline compound,

(1)

in Formula (1), P1 represents a group represented by Formula (P1-A), (P1-B) or (P1-C) that is a main chain of the repeating unit, L1 represents a single bond or a divalent linking group, SP1 represents a group including at least one selected from the group consisting of *—$(CH_2—CH_2O)_{n1}$—*, an oxypropylene structure, a polysiloxane structure or a fluorinated alkylene structure, SP2 represents a spacer group, M1 represents a mesogenic group, and EWG represents an electron-withdrawing group having a Hammett's substituent constant σp of greater than 0, n1 represents an integer greater than or equal to 2, * represents a bonding position to L1 or M1, and

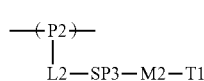
(2)

in Formula (2), P2 represents a group represented by Formula (P1-A), (P1-B) or (P1-C) that is a main chain of the repeating unit, L2 represents a single bond or a divalent linking group, SP3 represents a spacer group, M2 represents a mesogenic group having three or more cyclic structures, and T1 represents an electron-donating group having a Hammett's substituent constant σp of less than 0, and

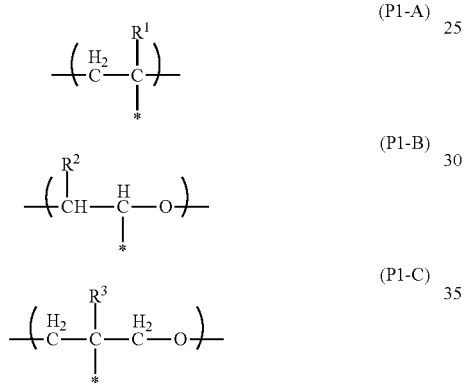

in Formulae (P1-A), (P1-B), and (P1-C), "*" represents a bonding position to the side chain type polymer liquid crystalline compound, and $R^1$, $R^2$, and $R^3$ each independently represent a hydrogen atom, a halogen atom, an alkyl group having 1 to 10 carbon atoms, or an alkoxy group having 1 to 10 carbon atoms.

2. The liquid crystalline composition according to claim 1,
wherein the electron-withdrawing group of the repeating unit 1 has a Hammett's substituent constant σp of 0.3 or greater, and
the group of the repeating unit 2 is an electron-donating group having a Hammett's substituent constant σp of −0.1 or less.

3. The liquid crystalline composition according to claim 1,
wherein a product of the Hammett's substituent constant σp of the electron-withdrawing group of the repeating unit 1 and a mass-based content ratio of the repeating unit 1 in the side chain type polymer liquid crystalline compound is 0.02 to 0.15.

4. The liquid crystalline composition according to claim 1,
wherein the product of the Hammett's substituent constant σp of the electron-withdrawing group of the repeating unit 1 and the mass-based content ratio of the repeating unit 1 in the side chain type polymer liquid crystalline compound is 0.050 to 0.130.

5. The liquid crystalline composition according to claim 1,
wherein SP1 in Formula (1) and SP3 in Formula (2) have the same structure.

6. The liquid crystalline composition according to claim 1,
wherein M1 in Formula (1) and M2 in Formula (2) have the same structure.

7. The liquid crystalline composition according to claim 1,
wherein SP2 in Formula (1) is a single bond.

8. A side chain type polymer liquid crystalline compound which is a copolymer, comprising:
a repeating unit 1; and
a repeating unit 2,
wherein a content of the repeating unit 1 is 12 to 40 mass % with respect to a total mass of the side chain type polymer liquid crystalline compound,
a content of the repeating unit 2 is 60 mass % or greater with respect to the total mass of the side chain type polymer liquid crystalline compound,
the repeating unit 1 is a repeating unit represented by Formula (1),
the repeating unit 2 does not correspond to the repeating unit represented by Formula (1), but is a repeating unit represented by Formula (2), and
M1 in Formula (1) and M2 in Formula (2) have the same structure,

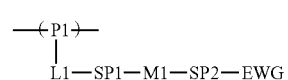
(1)

in Formula (1), P1 represents a group represented by Formula (P1-A), (P1-B) or (P1-C) that is main chain of the repeating unit, L1 represents a single bond or a divalent linking group, SP1 represents a group including at least one selected from the group consisting of *—(CH$_2$—CH$_2$O)$_{n1}$—*, an oxypropylene structure, a polysiloxane structure or a fluorinated alkylene structure, SP2 represents a spacer group, M1 represents a mesogenic group having three or more cyclic structures, and EWG represents an electron-withdrawing group having a Hammett's substituent constant σp of greater than 0, n1 represents an integer greater than or equal to 2, * represents a bonding position to L1 or M1, and

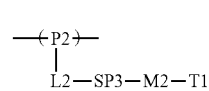
(2)

in Formula (2), P2 represents group represented by Formula (P1-A), (P1-B) or (P1-C) that is a main chain of the repeating unit, L2 represents a single bond or a divalent linking group, SP3 represents a spacer group, M2 represents a mesogenic group having three or more cyclic structures, and T1 represents an electron-donating group having a Hammett's substituent constant σp of less than 0, and

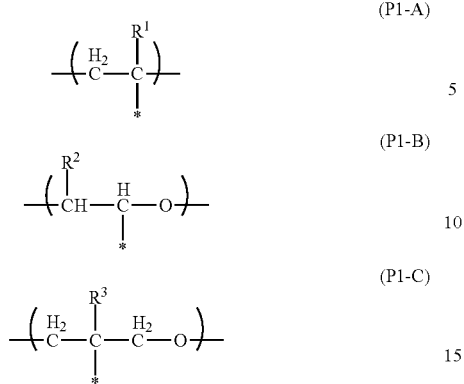

(P1-A)

(P1-B)

(P1-C)

in Formulae (P1-A), (P1-B), and (P1-C), "*" represents a bonding position to L1 in Formula (1) or a bonding position to L2 in Formula (2), and $R^1$, $R^2$, and $R^3$ each independently represent a hydrogen atom, a halogen atom, an alkyl group having 1 to 10 carbon atoms, or an alkoxy group having 1 to 10 carbon atoms.

9. A light absorption anisotropic film comprising the liquid crystalline composition according to claim 1.

10. A laminate comprising:
a base; and
the light absorption anisotropic film according to claim 9 which is provided on the base.

11. The laminate according to claim 10, further comprising:
a λ/4 plate which is provided on the light absorption anisotropic film.

12. An image display device comprising:
the light absorption anisotropic film according to claim 9.

13. An image display device comprising:
the laminate according to claim 10.

14. An image display device comprising:
the laminate according to claim 11.

15. A liquid crystalline composition comprising:
a side chain type polymer liquid crystalline compound; and
a dichroic substance,
wherein the side chain type polymer liquid crystalline compound is a copolymer having repeating units 1 and 2, the repeating unit 1 is a repeating unit represented by Formula (1), the repeating unit 2 does not correspond to the repeating unit represented by Formula (1), but is a repeating unit represented by Formula (2),
and M1 in Formula (1) and M2 in Formula (2) have the same structure, and

(1)

in Formula (1), P1 represents a group represented by Formula (P1-A), (P1-B) or (P1-C) that is a main chain of the repeating unit, L1 represents a single bond or a divalent linking group, SP1 represents a group including at least one selected from the group consisting of *—(CH$_2$—CH$_2$O)$_{n1}$—*, an oxypropylene structure, a polysiloxane structure or a fluorinated alkylene structure, SP2 represents a spacer group, M1 represents a mesogenic group, and EWG represents an electron-withdrawing group having a Hammett's substituent constant σp of greater than 0, n1 represents an integer greater than or equal to 2, * represents a bonding position to L1 or M1, and

(2)

in Formula (2), P2 represents a group represented by Formula (P1-A), (P1-B) or (P1-C) that is a main chain of the repeating unit, L2 represents a single bond or a divalent linking group, SP3 represents a spacer group, M2 represents a mesogenic group having three or more cyclic structures, and T1 represents an electron-donating group having a Hammett's substituent constant σp of less than 0, and

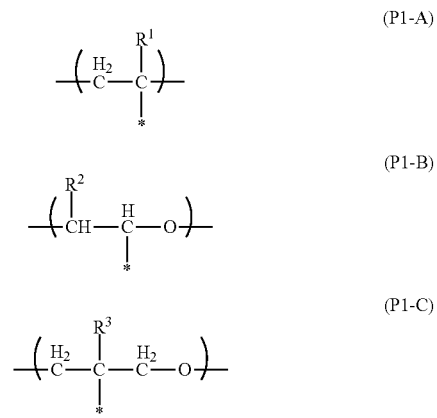

(P1-A)

(P1-B)

(P1-C)

in Formulae (P1-A), (P1-B), and (P1-C), "*" represents a bonding position to the side chain type polymer liquid crystalline compound, and $R^1$, $R^2$, and $R^3$ each independently represent a hydrogen atom, a halogen atom, an alkyl group having 1 to 10 carbon atoms, or an alkoxy group having 1 to 10 carbon atoms.

\* \* \* \* \*